(12) United States Patent
Murakami

(10) Patent No.: US 7,822,824 B2
(45) Date of Patent: Oct. 26, 2010

(54) METHOD FOR STARTING UP FILE SHARING SYSTEM AND FILE SHARING DEVICE

(75) Inventor: Shigenori Murakami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 12/007,547

(22) Filed: Jan. 11, 2008

(65) Prior Publication Data
US 2008/0307065 A1   Dec. 11, 2008

(30) Foreign Application Priority Data
Jun. 6, 2007   (JP)   ............................. 2007-150419

(51) Int. Cl.
G06F 15/167 (2006.01)
(52) U.S. Cl. .................... 709/213; 709/216; 707/781
(58) Field of Classification Search ............... 709/213, 709/216; 707/781
See application file for complete search history.

(56) References Cited

U.S. PATENT DOCUMENTS

| | | | |
|---|---|---|---|
| 6,421,711 B1* | 7/2002 | Blumenau et al. | 709/213 |
| 6,622,163 B1* | 9/2003 | Tawill et al. | 709/211 |
| 6,654,830 B1* | 11/2003 | Taylor et al. | 710/74 |
| 7,127,678 B2* | 10/2006 | Bhesania et al. | 715/744 |
| 2003/0131068 A1* | 7/2003 | Hoshino et al. | 709/216 |
| 2003/0210522 A1* | 11/2003 | Rietze et al. | 361/685 |
| 2003/0229689 A1* | 12/2003 | Raghavan et al. | 709/223 |
| 2004/0059901 A1* | 3/2004 | Miller et al. | 713/1 |
| 2005/0055402 A1* | 3/2005 | Sato | 709/205 |
| 2005/0132353 A1* | 6/2005 | Chen | 717/174 |

FOREIGN PATENT DOCUMENTS

JP   2005-267530   3/2004

* cited by examiner

*Primary Examiner*—Thu Nguyen
*Assistant Examiner*—Thomas J Dailey

(57) ABSTRACT

The file sharing system of the present invention is capable of starting up a file sharing device and preventing the connection of an external storage medium to an erroneous host using information that is saved in the external storage medium. In cases where the maintenance exchange work for a NAS device is performed, the collection section collects information that is required in order to start up the NAS system section. The saving section stores the collected information in the USB memory as startup information. In cases where the NAS device is returned after the maintenance exchange is complete, the USB memory is attached to the NAS device. The setting section reads the startup information that is stored in the USB memory and sets the communication control section in accordance with an instruction from the startup control section. As a result, the NAS-OS is read from the logical volume in the storage device and the NAS system section starts up.

6 Claims, 16 Drawing Sheets

METHOD FOR STARTING UP FILE SHARING SYSTEM AND FILE SHARING DEVICE

CROSS-REFERENCE TO RELATED APPLICATIONS

This application relates to and claims priority from Japanese Patent Application No. 2007-150419 filed on Jun. 6, 2007, the entire disclosure of which is incorporated herein by reference.

BACKGROUND OF THE INVENTION

1. Field of the Invention

The present invention relates to a method for starting up a file sharing system and a file sharing device.

2. Description of the Related-Art

In order to share data between a plurality of computers that are distributed across a network, a file sharing device is employed. As an initial-type of file sharing device, a file server that mounts a file sharing protocol such as a CIFS (Common Internet File System) or NFS (Network File System) on a general-purpose OS (Operating System) is known, for example. As an improved file sharing device, NAS (Network Attached Storage), which supports a plurality of file sharing protocols (CIFS, NFS, DAFS (Direct Access File System) or the like) and employs a dedicated OS which is specialized for file sharing services, is known.

In addition to NAS, SAN (Storage Area Network) storage is also known. SAN storage involves inputting and outputting data in block units to and from logical volumes that are set on a physical storage device such as a disk drive. Further, a file sharing system that involves co-operation between a NAS device and SAN storage is also known (Japanese Patent Application Laid Open No. 2005-267530).

The prior art that appears in Japanese Patent Application Laid Open No. 2005-267530 stores information that is required for the setting of the NAS system in a RAID storage area as block data. As a result, the prior art prohibits file access to the setting information and prevents the deletion of information that is required to set the NAS system as a result of an erroneous operation by the user.

In the prior art, as is presented in paragraph number [0024], a NAS disk array control section and disk enclosure are connected via an internal disk interface. In other words, because the NAS device and SAN storage are connected via an internal bus, the NAS device is able to access the disk drive relatively easily.

On the other hand, in cases where a NAS device and SAN storage are connected by using an external communication path for which authentication is required at the time of access as in the case of a file channel connection, for example, the NAS device is required to access the SAN storage by using information such as a preset WWN (World Wide Name) or LUN (Logical Unit Number). In cases where an access request that designates a predetermined LUN that is preset is issued by a device with a predetermined WWN that was preset, the SAN storage permits access.

Therefore, in cases where a NAS device is exchanged, the post-exchange NAS device is required to take over predetermined information such as a WWN or LUN or the like that has been set for the pre-exchange NAS device. This is because, in cases where predetermined information is not taken over, the post-exchange NAS device is unable to access the SAN storage.

In a normal case, the operating system (NAS-OS) whereby the NAS device provides file sharing services has a large capacity and is therefore stored in the SAN storage. The NAS device starts up the NAS system by reading the operating system from the SAN storage and executing same. Hence, because the operating system cannot be read in cases where the post-exchange NAS device is unable to access the SAN storage, the post-exchange NAS device cannot function as a NAS device.

SUMMARY OF THE INVENTION

The present invention was conceived in view of the above problem and an object thereof is to provide a method for starting up a file sharing system and file sharing device such that, in cases where a file sharing device and storage control device are connected via a communication path for which authentication is required at the time of access, the predetermined information that the file sharing device requires in order to access a logical volume in the storage control device can be set relatively easily for the file sharing device. A further object of the present invention is to provide a method for starting up a file sharing system and file sharing device such that, in cases where the file sharing device and storage control device are connected via a communication path for which authentication is required at the time of access, it is possible to prevent the setting of the predetermined information that the file sharing device requires in order to access a logical volume in the storage control device by mistake for another file sharing device. Further objects of the present invention will become evident from the following description of the embodiments.

In order to solve the above problem, in a file sharing system having at least one file sharing device and a storage control device that is connected to the file sharing device according to the present invention, (1) the storage control device comprises: (1-1) a logical volume in which an operating system that is read to the file sharing device is pre-stored; (1-2) an access control section that controls the feasibility of access to the logical volume; and (1-3) an I/O control section which, in cases where access is permitted by the access control section, reads the operating system from the logical volume and transmits same to the file sharing device in response to a request from the file sharing device, and (2) the file sharing device comprises: (2-1) an interface section for a connection to an external storage medium; (2-2) a communication control section that communicates with the storage control device via a communication path for which authentication is required at the time of access; (2-3) a collection section that collects predetermined information that is required in order to access the logical volume; (2-4) a saving section that stores the collected predetermined information in the external storage medium via the interface section; (2-5) a startup control section for starting up the operating system; (2-6) a setting section that reads the predetermined information from the external storage medium via the interface section in accordance with an instruction from the startup control section and sets the predetermined information thus read, for the communication control section; and (2-7) a file sharing section that provides file sharing services by means of the operating system that is read from the logical volume by the communication control section on the basis of the predetermined information that is set by the setting section.

According to an embodiment of the present invention, the setting section provisionally sets the predetermined information for the communication control section by storing the predetermined information in a temporary storage area that is prepared beforehand, and stores the predetermined information in the storage area in the communication control section in cases where the operating system can be read from the logical volume by the communication control section as a result of this provisional setting.

According to an embodiment of the present invention, the setting section deletes the predetermined information that is set for the communication control section in cases where the communication control section is unable to read the operating system from the logical volume.

According to an embodiment of the present invention, the setting section deletes the predetermined information that is set for the communication control section in cases where the startup of the operating system cannot be confirmed.

According to an embodiment of the present invention, the predetermined information includes identification information for uniquely specifying the file sharing device in which the predetermined information is collected; and the access control section permits the communication control section to access the logical volume only when the predetermined information used by the communication control section matches predetermined information that is set for the access control section beforehand.

According to an embodiment of the present invention, the identification information is either one or both of a serial number that is preset for the communication control section and a device number that is preset for the file sharing device.

According to an embodiment of the present invention, the file sharing device comprises an erroneous connection detection section for detecting the erroneous connection of an external storage medium storing predetermined information relating to another file sharing device.

According to an embodiment of the present invention, first medium identification information for uniquely identifying the external storage medium is preset for the external storage medium; and the erroneous connection detection section judges that an erroneous connection has been made in cases where second medium identification information that is preset and the first medium identification information that is read from the external storage medium connected to the interface section do not match one another and judges that a correct connection has been made in cases where the second medium identification information matches the first medium identification information.

According to an embodiment of the present invention, the erroneous connection detection section judges whether the communication control section is able to access the logical volume using the current setting of the communication control section, prior to the predetermined information being set for the communication control section by the setting section, and in cases where it is judged that the communication control section is able to access the logical volume using the current setting, judges that an erroneous connection has been made, and in cases where it is judged that the communication control section is unable to access the logical volume using the current setting and where the current predetermined information set for the communication control section and the predetermined information that is stored in the external storage medium do not match, judges that a correct connection has been made.

A method for starting up a file sharing device to which an external storage medium can be attached and detached, in accordance with another aspect of the present invention, a storage control device with a logical volume in which an operating system is stored and the file sharing device being connected so as to capable of two-way communication via a communication path for which authentication is required at the time of access, comprises the steps of: collecting predetermined information that is required in order to access the logical volume; storing the collected predetermined information in an external storage medium; issuing an instruction to start up the operating system; reading the predetermined information from the external storage medium in accordance with the instruction; setting the predetermined information thus read, for the communication control section; reading the operating system from the logical volume by means of the communication control section; and starting up the operating system thus read.

At least some of the respective parts and respective steps of the present invention can sometimes be implemented by a computer program. Such a computer program is stored in a storage device or distributed via a communication network, for example.

DESCRIPTION OF THE SPECIFIC EMBODIMENTS

Figure 1:
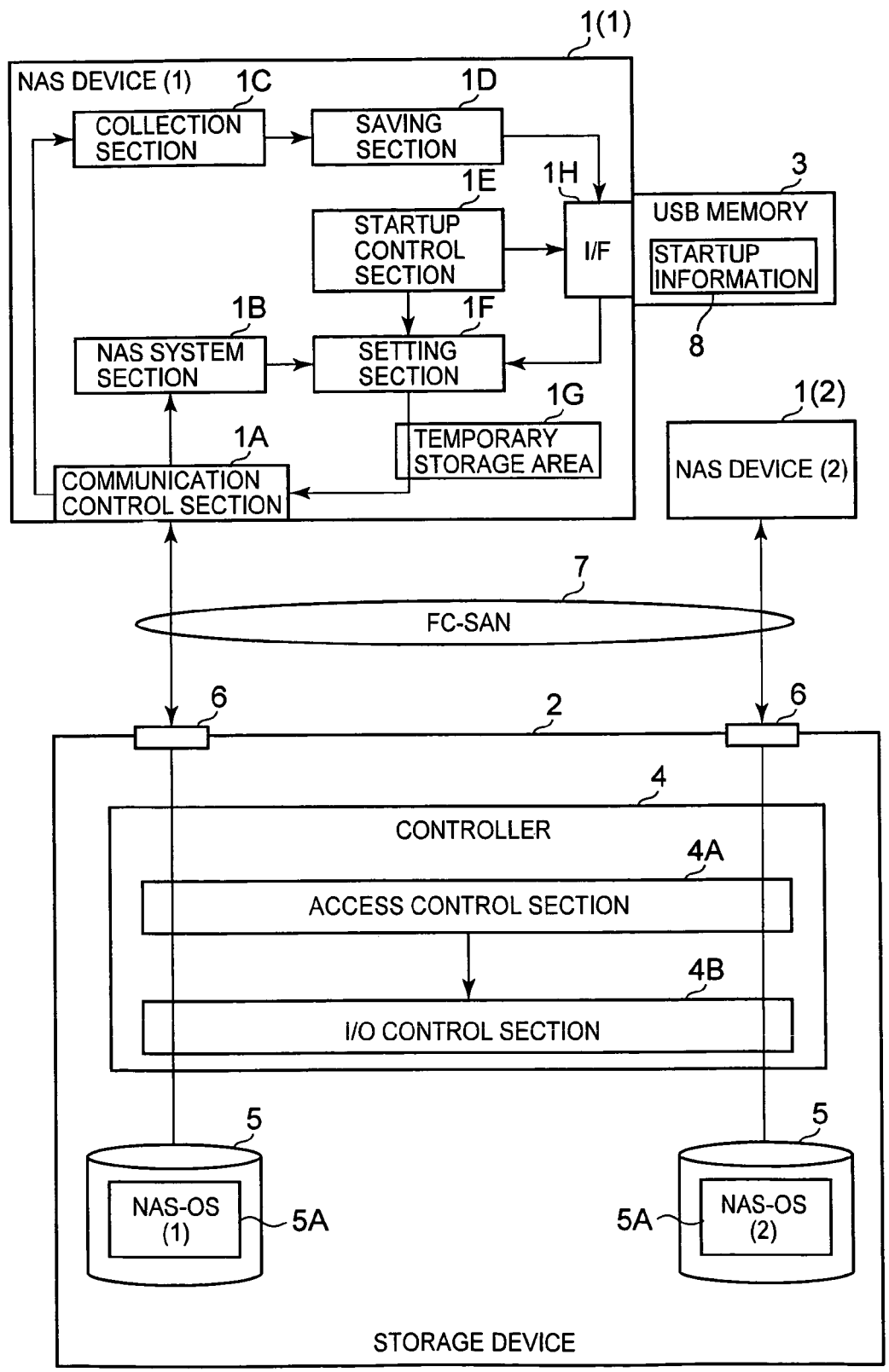
FIG. 1 is an explanatory diagram providing an overview of the file sharing system of an embodiment of the present invention.

FIG. 1 is an explanatory diagram providing an overview of an embodiment of the present invention. The file sharing system shown in FIG. 1 comprises, for example, a plurality of NAS devices 1 (1), 1 (2) (where no particular distinction is required hereinbelow, these are called NAS devices 1), at least one storage device 2, and a USB memory 3. The USB memory is an example. Any kind of device can be used as long as same is a device that is capable of storing information.

Each NAS device 1 corresponds to a 'file sharing device'. The respective NAS devices 1 sometimes constitute a cluster in order to improve reliability. The respective NAS devices 1 are connected so as to be capable of two-way communication to the storage device 2 via a communication path 7 which is the 'communication path for which authentication is required at the time of access'. The communication path 7 is constituted as a communication path to which and from which data is input/output in block units on the basis of the fibre channel protocol, for example.

The constitution of a storage device 2 will be described next. The storage device 2 corresponds to the 'storage control device'. The storage device 2 comprises, for example, a controller 4, a plurality of logical volumes 5, and a communication section 6.

The controller 4 controls the operation of the storage device 2. The controller 4 is constituted as a computer device comprising at least one microprocessor and at least one memory device or the like, for example. The controller 4 comprises an access control section 4A and an I/O (Input/Output) control section 4B.

The access control section 4A judges whether access by the NAS device 1 to the logical volume 5 is permitted. The access control section 4A judges, for example, the feasibility of access by the NAS device 1 to the logical volume 5 based on the LUN, WWN, target ID, and the port number of the HBA (Host Bus Adapter) as is known per the LUN security technique, for example. The I/O control section 4B reads data from the logical volume 5 or writes data to the logical volume 5 on the basis of an access request from the NAS device 1 in cases where access by the access control section 4A is permitted.

The logical volume 5 is a logical storage area that is provided by using physical storage areas of physical storage devices. A variety of devices capable of reading and writing data can be used as the physical storage devices, such as, for example, a hard disk device, a semiconductor memory device, an optical disk device, a magneto-optical disk device, a magnetic tape device, and a flexible disk device. Storage devices that can be used in cases where a hard disk device is used include, for example, an FC (Fibre Channel) disk, an SCSI (Small Computer System Interface) disk, a SATA disk, an ATA (AT Attachment) disk, and an SAS (Serial Attached SCSI) disk. A variety of memory devices can be used in cases where a semiconductor memory device is used as the storage device, including, for example, flash memory, Ferroelectric Random Access Memory (FeRAM), Magnetoresistive Random Access Memory (MRAM), Ovonic Unified Memory, Resistance RAM (RRAM).

The logical volume 5 stores an operating system (NAS-OS hereinbelow) 5A for starting up the system of the NAS device 1. The logical volume 5 is associated beforehand with a predetermined communication section 6 and the logical volume 5 can be accessed only by a predetermined NAS device 1 that is set beforehand. In the example shown in FIG. 1, the logical volume 5 on the left side of FIG. 1 is accessed by the NAS device 1 (1) and the logical volume 5 on the right side of FIG. 1 is accessed by the NAS device 1 (2).

The communication section 6 performs data communications with the communication control section 1A of the NAS device 1 in accordance with the Fibre Channel protocol.

The constitution of the NAS device 1 will now be described. The NAS device 1 is constituted as a computer device comprising a microprocessor and a memory, for example. When we consider the function of the NAS device 1, the NAS device 1 is constituted comprising, for example, a communication control section 1A, a NAS system section 1B, a collection section 1C, a saving section 1D, a startup control section 1E, a setting section 1F, a temporary storage area 1G, and an interface section 1H.

The communication control section 1A corresponds to the 'communication control section'. The communication control section 1A performs data communications with the storage device 2 in accordance with the Fibre Channel protocol. The communication control section 1A is constituted as a Fibre Channel communication control substrate (FC substrate) comprising HBA, for example.

The NAS system section 1B corresponds to the 'file sharing section'. The NAS system section 1B is implemented as a result of the startup of the NAS-OS 5A. The NAS system section 1B provides file sharing services to a client device outside the scope of FIG. 1 which is connected to the NAS device 1.

The collection section 1C corresponds to the 'collection section'. The collection section 1C collects, from within the NAS device 1, startup information 8 that is required for the NAS-OS 5A to be read from the logical volume 5 and started up. Further, in cases where the required information exists in the storage device 2, the collection section 1C is also able to collect the information from the storage device 2.

The saving section 1D corresponds to the 'saving section'. The saving section 1D stores startup information 8 that is collected by the collection section 1C in the USB (Universal Serial Bus) memory 3. The startup control section 1E corresponds to the 'startup control section'. The startup control section 1E instructs the start of the startup of the NAS-OS 5A. The startup control section 1E is constituted comprising a BIOS (Basic Input Output System) that has every type of driver software, for example.

The setting section 1F corresponds to the 'setting section' The setting section 1F reads startup information 8 that is stored in the USB memory 3 and thus sets the communication control section 1A. The setting section 1F is able to provisionally set the startup information 8 for the communication control section 1A by storing the startup information 8 for the temporary storage area 1G. In cases where the reading of the NAS-OS 5A is successful, the setting section 1F is able to formally set the startup information 8 for the communication control section 1A. The temporary storage area 1G can be set for the memory in the communication control section 1A or the local memory in the NAS device 1, for example.

The interface section 1H corresponds to the 'interface section' The interface section 1H serves to send and receive data to and from the USB memory 3.

The USB memory 3 corresponds to the 'external storage medium'. As detailed subsequently, the USB memory 3 pre-stores startup information 8 that is required in order to start up the NAS device 1 prior to exchanging the NAS device 1. The NAS device 1 is re-connected to the storage device 2 after the deteriorated part or faulty part has been exchanged. By mounting the USB memory 3 in the NAS device 1 that has undergone maintenance work, the startup information 8 in the USB memory 20 is automatically set for the communication control section 1A.

The USB memory 3 is an example of an external storage medium and the present invention is not limited to the USB memory 3. For example, various storage media such as a hard disk drive, flash memory device, an IC card, or a memory card can be used, for example. An involatile storage medium that is portable such as the USB memory 3 is preferably used. However, a variety of storage media can be used irrespective of whether same afford the convenience of being portable or are involatile.

The startup information 8 corresponds to the 'predetermined information required in order to access a logical volume' and the startup information 8 includes, for example, the WWN, LUN and target ID of the NAS device 1, the WWN of the storage device 2. As is clear from the subsequent embodiments, the identification information for uniquely specifying the NAS device 1 and communication control section 1A can also be included in the startup information 8.

The operation of the file sharing system will now be described. In a normal case, the NAS device 1 provides file sharing services to a client device that is outside FIG. 1 by means of the NAS system section 1B. In other words, the NAS system section 1B accesses the storage device 2 in response to a file access request from the client device and inputs and outputs data to and from the storage device 2.

The NAS device 1 is exchanged for maintenance purposes at regular or irregular intervals. In cases where a plurality of NAS devices 1 are operated using a cluster configuration, there is no effect on the file sharing services even when any one NAS device 1 is removed for maintenance. The file sharing services are provided successively to the client device by the remaining NAS device 1.

The maintenance target NAS device 1 is removed from the file sharing system after its connection with the storage device 2 is released. The NAS device 1 is taken to a maintenance center where deteriorated parts and so forth are exchanged, for example. With the maintenance work complete, the NAS device 1 is shipped from the maintenance center and re-connected to the storage device 2.

In order for a NAS device 1 which is a virtually new to function as NAS, the NAS-OS 5A stored in the logical volume 5 in the storage device 2 must be read and executed.

However, in cases where part or all of the information required to access the logical volume 5 is lost as a result of maintenance work, the NAS device 1 is unable to read the NAS-OS 5A from the logical volume 5 and the NAS system cannot be started up.

In this case, a method that involves once again manually establishing an association between the logical volume 5 and NAS device 1 may be considered. In other words, an operation that involves generating a new logical volume 5, newly storing the NAS-OS 5A in the logical volume 5 and manually associating the WWN or the like of the communication section 6 connected to the logical volume 5 and the WWN or the like of the NAS device 1, for example, is required. Such manual resetting work takes time, involves user labor and is not convenient. In addition, because the work is manual work, there is also the possibility of human error.

Therefore, according to the present invention, before the maintenance target NAS device 1 is removed from the file sharing system, the startup information 8 that is required for the NAS device 1 to read the NAS-OS 5A from the logical volume 5 and start up the NAS-OS 5A is saved to the USB memory 3.

In cases where the NAS device 1 that has undergone maintenance is returned, the work for the physical connection between the NAS device 1 and the storage device 2 is then performed, whereupon USB memory 3 is connected to the NAS device 1. The startup information 8 that is stored in the USB memory 3 is set for the communication control section 1A by the setting section 1F on the basis of an instruction from the startup control section 1E.

The communication control section 1A is able to access the logical volume 5 that was connected prior to the maintenance work and read the NAS-OS 5A that is stored in the logical volume 5. As a result, the NAS device 1 rapidly executes a system startup to provide the file sharing services.

The details will be clearly provided in the subsequent embodiments. However, the possibility exists for the USB memory 3 to be mounted in another NAS device 1. In particular, in cases where a cluster is constituted by a plurality of NAS devices 1 and where maintenance work is performed at the same time for a plurality of NAS devices 1 in the same cluster, there is the risk that the USB memory 3 that stores startup information 8 relating to a certain NAS device 1 will be mounted in another NAS device 1 by mistake.

Therefore, according to the present invention, either or both of the storage device 2 or NAS device 1 comprises a device for preventing an erroneous connection of the USB memory 3, for example. For example, by judging the feasibility of access by the storage device 2 by using a serial number for uniquely identifying the device number that uniquely identifies the NAS device 1 and the communication control section 1A, a situation where the startup information 8 is overwritten to an unrelated NAS device 1 by mistake can be prevented.

In this embodiment that is constituted in this manner, the maintenance work of the NAS device 1 can be performed relatively rapidly and accurately and user convenience improves. In addition, according to this embodiment, a situation where the startup information 8 relating to one NAS device 1 is stored by mistake in another NAS device 1 can of course be prevented, the reliability during the maintenance exchange work can be increased, and user convenience can be improved. Embodiments of the present invention will be described in detail hereinbelow.

First Embodiment

Figure 2:
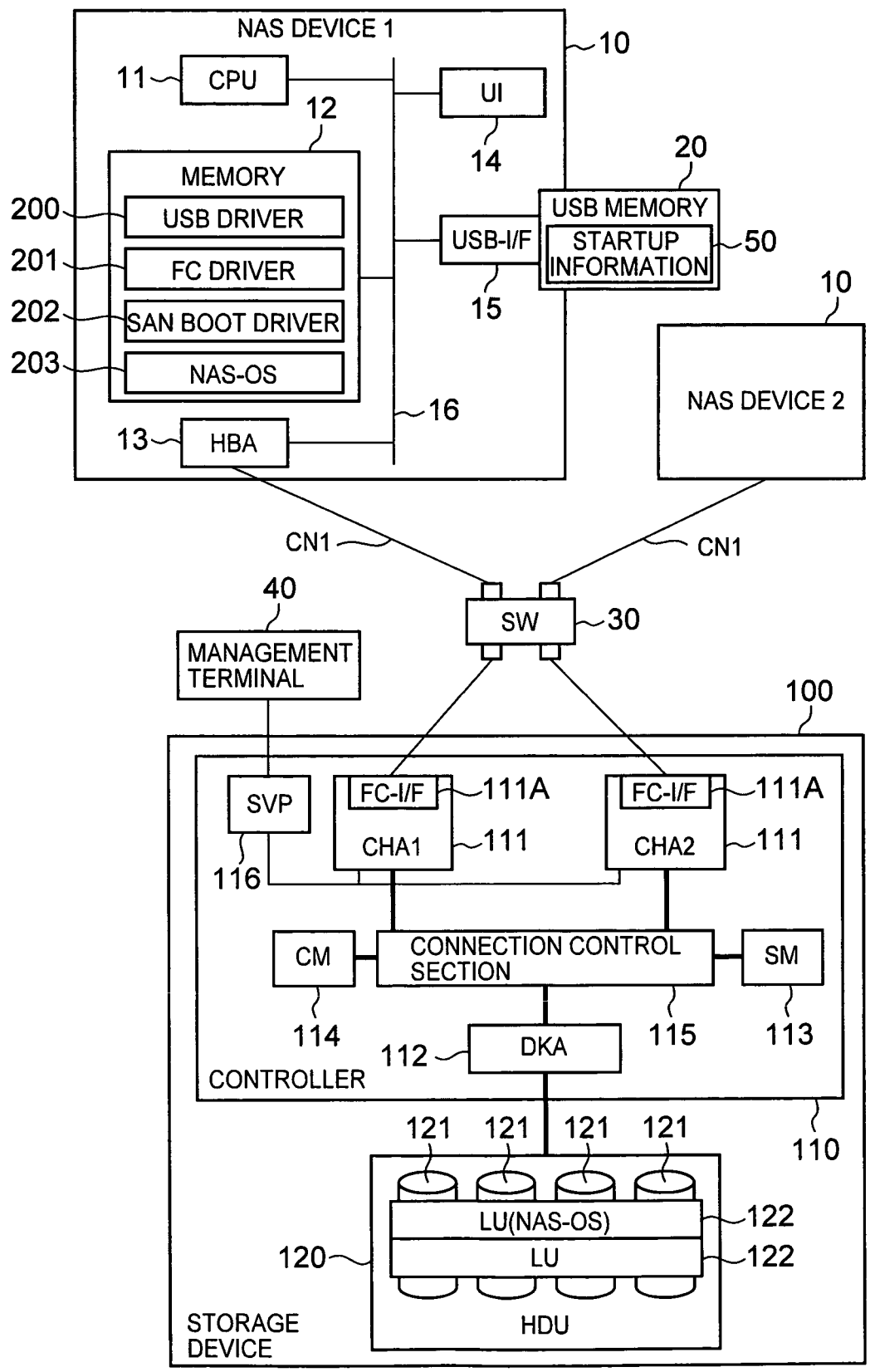
FIG. 2 is an explanatory diagram of the hardware constitution of the file sharing system.

FIG. 2 is a block diagram of the hardware constitution of the file sharing system. The file sharing system is constituted comprising a plurality of NAS devices 10, at least one storage device 100, and a USB memory 20, for example. The respective NAS devices 10 and the storage device 100 are connected so as to be capable of two-way communication via a switch 30. A management terminal 40 can be connected to the storage device 100. Further, the management server outside FIG. 2, the storage device 100, and the respective NAS devices 10 can also be connected so as to be capable of two-way communication via a LAN (Local Area Network).

The relationship of FIG. 2 with respect to FIG. 1 will now be described. The NAS device 10 corresponds to the NAS device 1 in FIG. 1, the storage device 100 corresponds to the storage device 2 in FIG. 1, and the USB memory 20 corresponds to the USB memory 3 in FIG. 1. The communication path CN1 corresponds to the communication path 7 in FIG. 1, the communication interface 111A corresponds to the communication section 6 in FIG. 1, and the logical volume 122 corresponds to the logical volume 5 in FIG. 1. The HBA 13 corresponds to the communication control section 1A in FIG. 1, the USB I/F 15 corresponds to the interface section 1H in FIG. 1, and the startup information 50 corresponds to the startup information 8 in FIG. 1.

The access control section 4A and I/O control section 4B shown in FIG. 1 are implemented by a program that is executed by a microprocessor in a controller 110. The respective functions 1B to 1F in the NAS device 1 shown in FIG. 1 are implemented as a result of the microprocessor 11 of the NAS device 10 executing a predetermined program. The temporary storage area 1G in FIG. 1 is provided by using the memory in HBA 13 or the memory 12 in the NAS device 10.

The constitution of the NAS device 10 will now be described. The NAS device 10 comprises, for example, a microprocessor (CPU in FIG. 2) 11, the memory 12, the HBA 13, the user interface (UI in FIG. 2) 14, the USB I/F 15, and the internal bus 16. The memory 12 stores, for example, a USB driver 200, an FC driver 201, a SAN boot driver 202, and an NAS-OS 203.

The USB driver 200 is software for inputting and outputting data to and from the USB memory 20. The FC driver 201 is software for performing data communications on the basis of the Fibre Channel protocol. The SAN boot driver 202 is software for reading the NAS-OS 203 from the logical volume 122 and starting up the NAS-OS 203. The NAS-OS 203 is software for providing the client device outside FIG. 2 with file sharing services.

The USB memory 20 is detachably attached to the NAS device 10. The USB memory 20 stores startup information 50 that is collected from the NAS device 10. The NAS device 10 is able to set the startup information 50 stored in the USB memory 20 for the HBA 13, as will be described subsequently.

The switch 30 is constituted as a Fibre Channel switch, for example. By using the switch 30, a plurality of NAS devices 10 can be connected to the storage device 100.

The management terminal 40 changes the constitution of the storage device 100, acquires every kind of information from the storage device 100, and displays this information on the terminal display.

The constitution of the storage device 100 will now be described. The storage devices 100 can be broadly classified into the controller 110 and the storage device mount section ('HDU' hereinbelow) 120. The controller 110 controls the operation of the storage device 100. The controller 110 is constituted comprising, for example, a plurality of channel adapters ('CHA' hereinbelow) 111, a plurality of disk adapters (only one is shown in FIG. 2, which appears as 'DKA' hereinbelow) 112, a shared memory ('SM' hereinbelow) 113, a cache memory ('CM' hereinbelow) 114, a connection control section 115, and a service processor ('SVP' hereinbelow) 116.

The CHA 111 is a computer device for performing FCP (Fibre Channel Protocol)-based communications, for example. The CHA 111 are constituted by one or a plurality of substrates on which a microprocessor and memory and so forth are mounted, for example, and this memory stores a program for analyzing and executing FCP-based commands. The CHA 111 comprise at least one fibre channel interface (displayed as 'FC-I/F' in FIG. 2) 111A. The fibre channel interfaces 111A have their WWN preset. By specifying the WWN and target IDs, the CHA 111 are able to communicate with the NAS devices 10.

The DKA 112 exchanges data with disk drives 121 that the HDU 120 comprises. The DKA 112 is constituted as a computer device comprising a microprocessor and a memory and so forth as per the CHA 111. In FIG. 2, only one DKA 112 is shown for the sake of convenience but, in actuality, a plurality of DKA 112 are provided.

The DKA 112 is connected to the respective disk drives 121 in the HDU 120 via a fiber channel. The DKA 112 writes data that are received by the respective CHA 111 and stored in the cache memory 114 to predetermined addresses in predetermined disk drives 121. The DKA 112 reads data that are requested from the respective CHA 111 from predetermined disk drives 121 and stores the data in the cache memory 114.

The DKA 112 converts a logical address into a physical address. A logical address is an address indicating a block position in a logical volume and is known as an LBA (Logical Block Address). A physical address is an address indicating a write position in the disk drive 121. The DKA 112 performs data access corresponding with a RAID configuration in cases where the disk drives 121 are managed per the RAID system. For example, the DKA 112 writes the same data to a plurality of disk drives 121 (RAID1) or executes a parity calculation to distribute and write data and parities to a plurality of disk drives 121 (RAID5 and so forth).

The shared memory 113 is a memory for storing every kind of management information and control information and so forth that is employed in order to control the operation of the storage device 100. The cache memory 114 is a memory for storing data that are received by the CHA 111 or data that have been read from the disk drives 121 by the DKA 112.

Any one or a plurality of disk drives 121 may be used as a cache disk. As per FIG. 2, the cache memory 114 and shared memory 113 may also each be constituted as separate memory. Alternatively, a partial storage area of the same memory may be used as a cache area while another storage area may be used as a control area.

The connection control section 115 mutually connects the CHA 111, DKA 112, cache memory 114, and shared memory 113. The connection control section 115 is constituted as a loss path switch that performs data transmission by means of a high-speed switching operation, for example.

The SVP 116 is connected to each CHA 111 via a communication network such as a LAN, for example. The SVP 116 is able to access the DKA 112, cache memory 114, and shared memory 113 via the CHA 111, for example. The SVP 116 collects information relating to every kind of state in the storage device 100 and supplies the information to the management terminal 40. The user is able to learn of every kind of state of the storage device 100 via the screen of the management terminal 40.

The user is able to establish an access path between the NAS device 10 and logical volume, for example, via the SVP 116 from the management terminal 40, generate a logical volume 122, and delete a logical volume 122.

The HDU 120 comprises a plurality of disk drives 121. Although a disk drive is cited by way of example in this specification, the present invention is not limited to a hard disk drive. For example, various storage devices and equivalents thereof such as semiconductor memory drives (including flash memory devices) and holographic memory and so forth can be used. Further, different kinds of disks can also be mixed within the HDU 120 such as FC disks, SATA disks, and ATA disks, for example.

One RAID group (also called a 'parity group') is formed by a plurality of disk drives 121. A RAID group is obtained by virtualizing a physical storage area of respective disk drives 121 in accordance with the RAID level and can be called a physical storage device. The physical storage area of the RAID group is a predetermined size or an optional size and can be provided by one or a plurality of logical volumes 122. The logical volume 122 is displayed as 'LU' in FIG. 2. The logical volume 122 can be called a logical storage device. In this embodiment, a NAS-OS is pre-stored in a predetermined logical volume 122 that is used by the NAS device 10. File data that are employed by the NAS device 10 are also stored in the predetermined logical volume 122.

The data I/O operation of the storage device 100 will now be described in simple terms. A read command that is issued by the NAS device 10 is received by the CHA 111. The CHA 111 stores the read command in the shared memory 113.

The DKA 112 references the shared memory 113 as occasion calls. Upon finding an unprocessed read command, the DKA 112 accesses the disk drive 121 constituting the logical volume 122 designated as the read destination and reads the requested data. The DKA 112 performs physical address and logical address conversion processing and stores the data read from the disk drive 121 in the cache memory 114. The CHA 111 transmits the data that are stored in the cache memory 114 to the NAS device 10. In cases where the data requested by the NAS device 10 are already stored in the cache memory 114, the CHA 111 transmits the data stored in the cache memory 114 to the NAS device 10.

The write command issued by the NAS device 10 is received by the CHA 111 as in the case of a read command. The CHA 111 stores the write data transmitted by the NAS device 10 to the cache memory 114. The DKA 112 stores the write data stored in the cache memory 114 in the disk drive 121 constituting the logical volume 122 designated as the write destination.

Further, the constitution may also be such that the NAS device 10 is notified that processing is complete at the point where the write data are stored in the cache memory 114, or the constitution may be such that the NAS device 10 is notified that processing is complete after write data are written to the disk drive 121.

Figure 3:
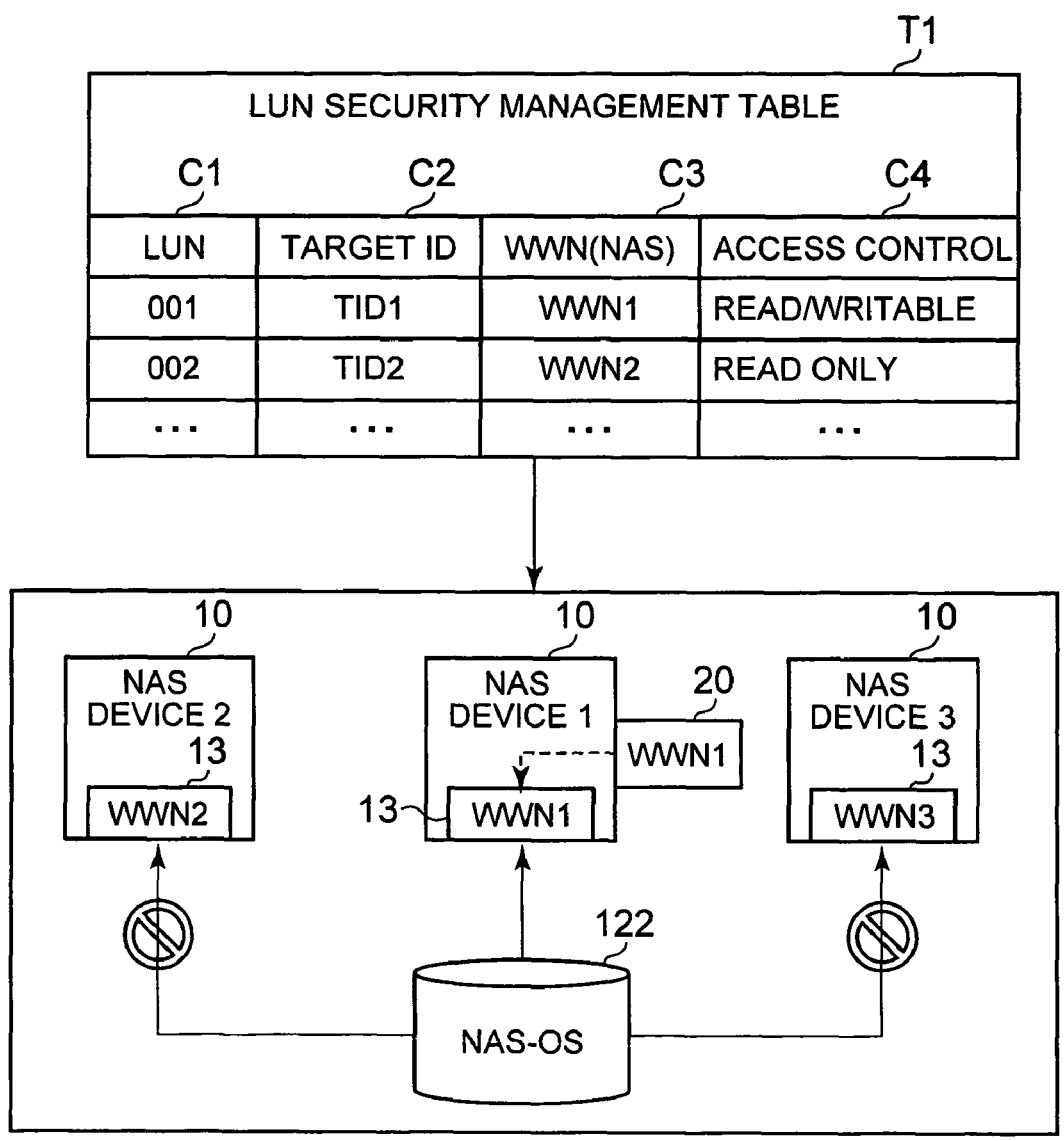
FIG. 3 is an explanatory diagram of the constitution of a LUN security management table.

FIG. 3 is an explanatory diagram showing an example of a LUN security management table T1 that constitutes at least part of the 'access control section'. 'LUN security' is a technology that permits access to the logical volume 122 for only a preset NAS device 10.

The management table T1 can comprise a LUN item C1, target ID item C2, a WWN item C3, and an access control item C4, for example. Other items may also be provided. 'WWN' indicates the WWN that is set for the HBA 13 of the NAS device 10. The 'target ID' is information for specifying the communication port which is the target port. 'Access control' is information controlling the type of access. Examples of access control can include the 'readable and writable' and 'read only'.

Thus, the feasibility of access to the logical volume 122 that is associated with the LUN depending on whether the combination of the LUN, target ID, and WWN is correct is judged. As shown in the lower half of FIG. 3, even when there is a match between the LUN and target ID, for example, in cases where the WWN of the source of the access request (WWN2 or WWN3) differs from the WWN (WWN1) registered in the management table T1, access is denied.

Figure 4:
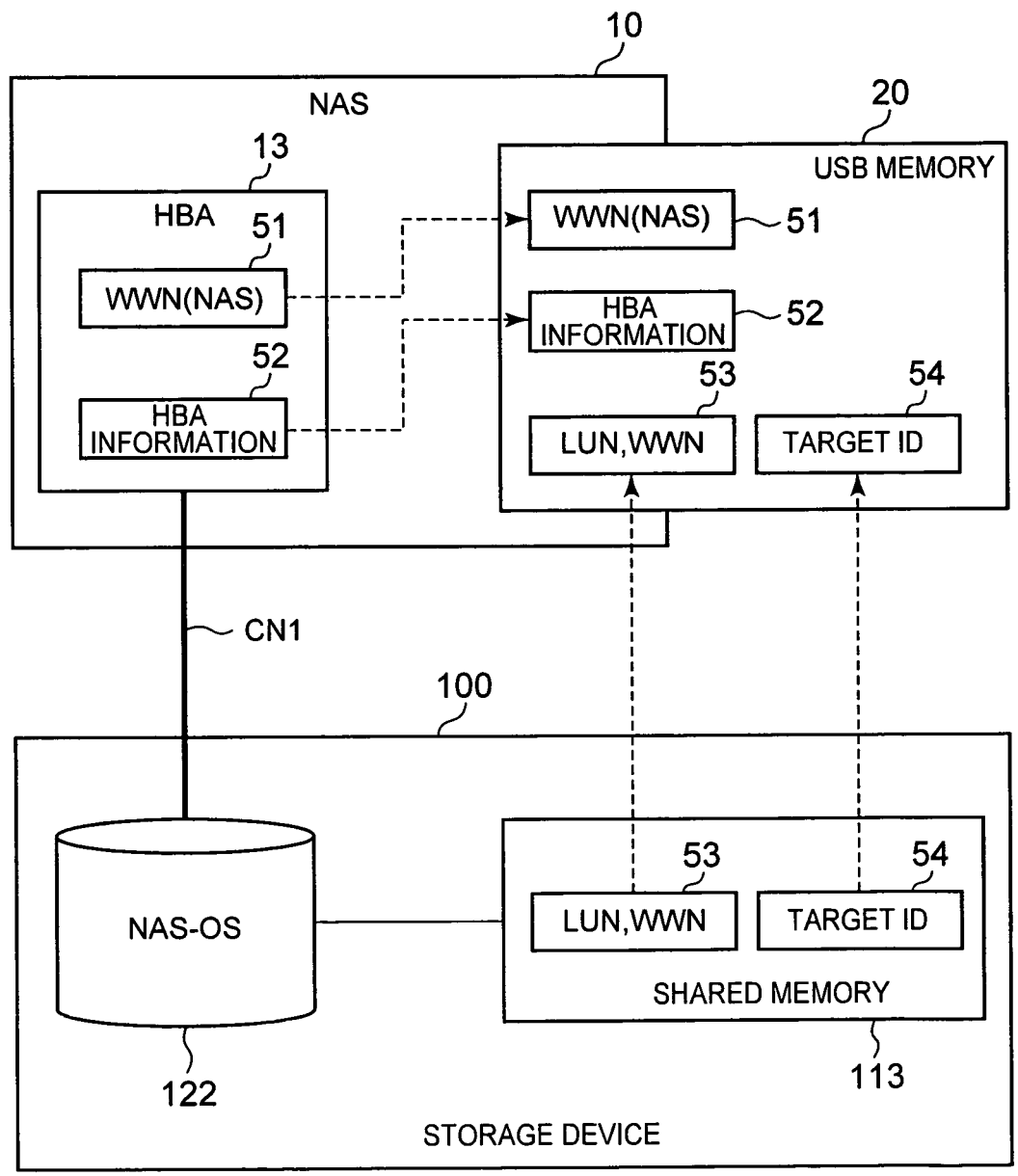
FIG. 4 is an explanatory diagram of the constitution of startup information that is stored in USB memory.

FIG. 4 is an explanatory diagram that schematically shows the constitution of the startup information 50. The startup information 50 is constituted comprising, for example, the WWN51 of the NAS device 10, the HBA information 52, the information 53 of the LUN and the WWN of the storage device 100, and the information 54 of the target ID.

The HBA information 52 is information indicating which communication port among the plurality of communication ports that the HBA 13 comprises is used. Further, although the FC communication control substrate is simplified as HBA 13 for the sake of convenience, in reality, a plurality of HBA can be installed in the FC communication control substrate and each HBA can comprise a plurality of communication ports.

Further, FIG. 4 shows that the WWN information 51 and HBA information 52 of the NAS device 10 are collected from the HBA 13 and the information 53 of the LUN and WWN of the storage device 100 and the target ID information 54 are collected from the shared memory 113. However, in reality, these information items 51 to 54 can be collected from the HBA 13. In FIG. 4, the original locations of each information item are shown. The WWN set for the NAS device 10 is sometimes displayed as WWN (NAS) and the WWN set for the storage device 100 is sometimes displayed as WWN (SAN) hereinbelow.

Figure 5:
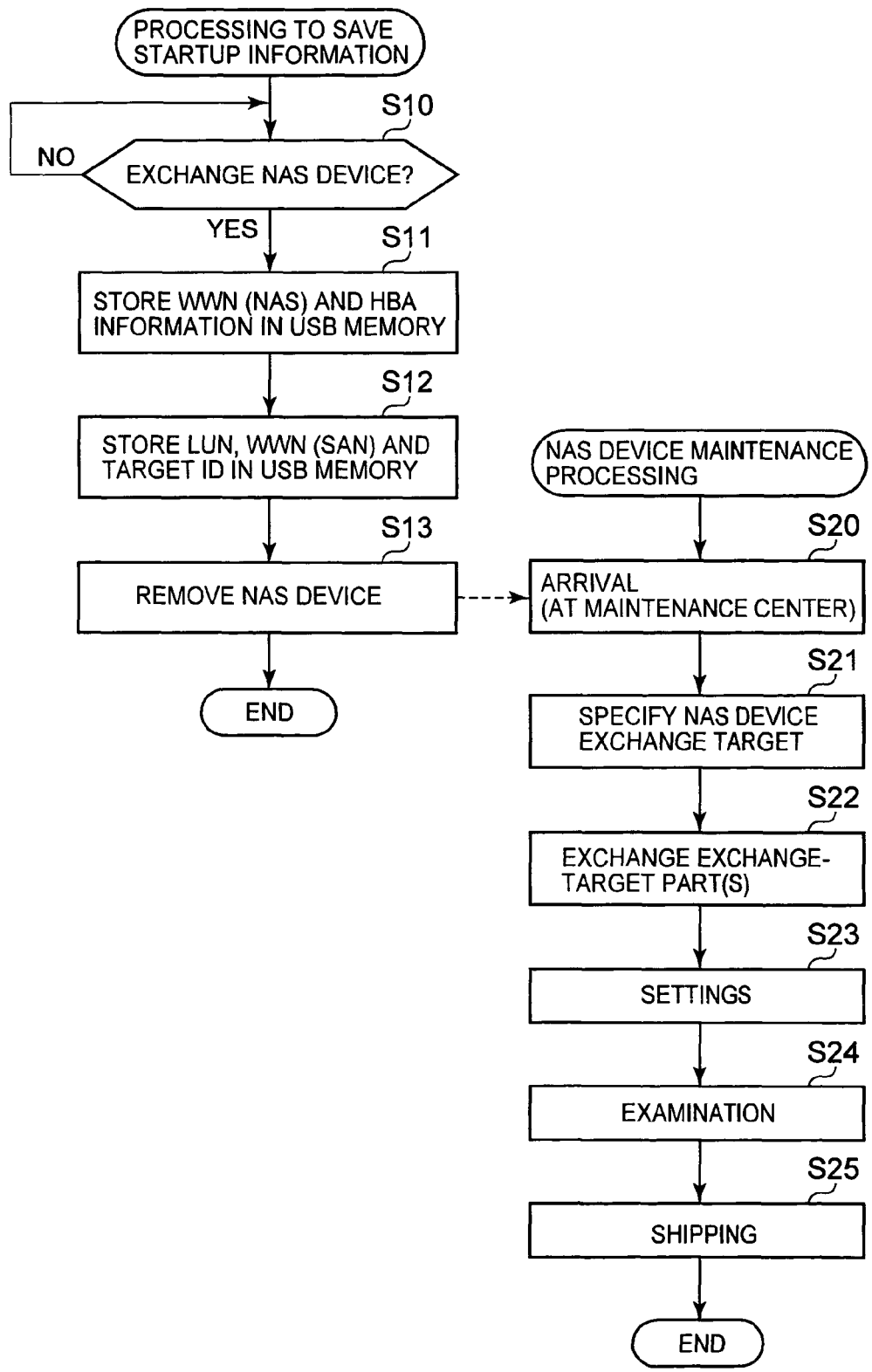
FIG. 5 is a flowchart showing the respective processing to save startup information to the USB memory and to perform the maintenance of the NAS device.

FIG. 5 is a flowchart showing the processing and so forth for saving the startup information 50 to the USB memory 20. In cases where maintenance work for the NAS device 10 is carried out, the user instructs the removal of the NAS device 10 via the user interface section 14 of the NAS device 10. The NAS device 10 is able to judge that same is to be exchanged for maintenance work according to the instruction from the user (S10).

When an instruction to exchange the NAS device 10 is issued (S10: YES), the NAS device 10 collects WWN (NAS) and HBA information and stores same in the USB memory 20 (S11). Thereafter, the NAS device 10 collects the LUN, target ID and WWN (SAN) and stores same in the USB memory 20 (S12). Further, although this process is described as being divided into two steps which are S11 and S12 for the sake of convenience, the respective information items 51 to 54 shown in FIG. 4 can be stored in the USB memory 20 using a single step.

If the startup information 50 is stored in the USB memory 20, notification to the effect that the NAS device 10 can be removed is sent to the user via the user interface 14 (S13). Upon checking the notification, the user halts the supply of power to the NAS device 10, cancels the connection between the storage device 100 and NAS device 10, and removes the NAS device 10 from the file sharing system.

The removed NAS device 10 is sent to the maintenance center. Upon arrival of the NAS device 10 at the maintenance center (S20), the part which is the exchange target among the constituent parts of the NAS device 10 is specified (S21). At the maintenance center, the specified part is exchanged for a new part (S22), and various settings are made (S23). The maintenance center examines whether the NAS device 10 is working normally (S24) and, when the examination is a success, the NAS device 10 is shipped to the user (S25). Further, S20 to S25 above are a general outline of the procedure for the maintenance work at the maintenance center and do not constitute a procedure that is executed by a computer device. However, at least some of the maintenance work that is carried out at the maintenance center can sometimes be automatically or semi-automatically performed by using a computer device.

Figure 6:
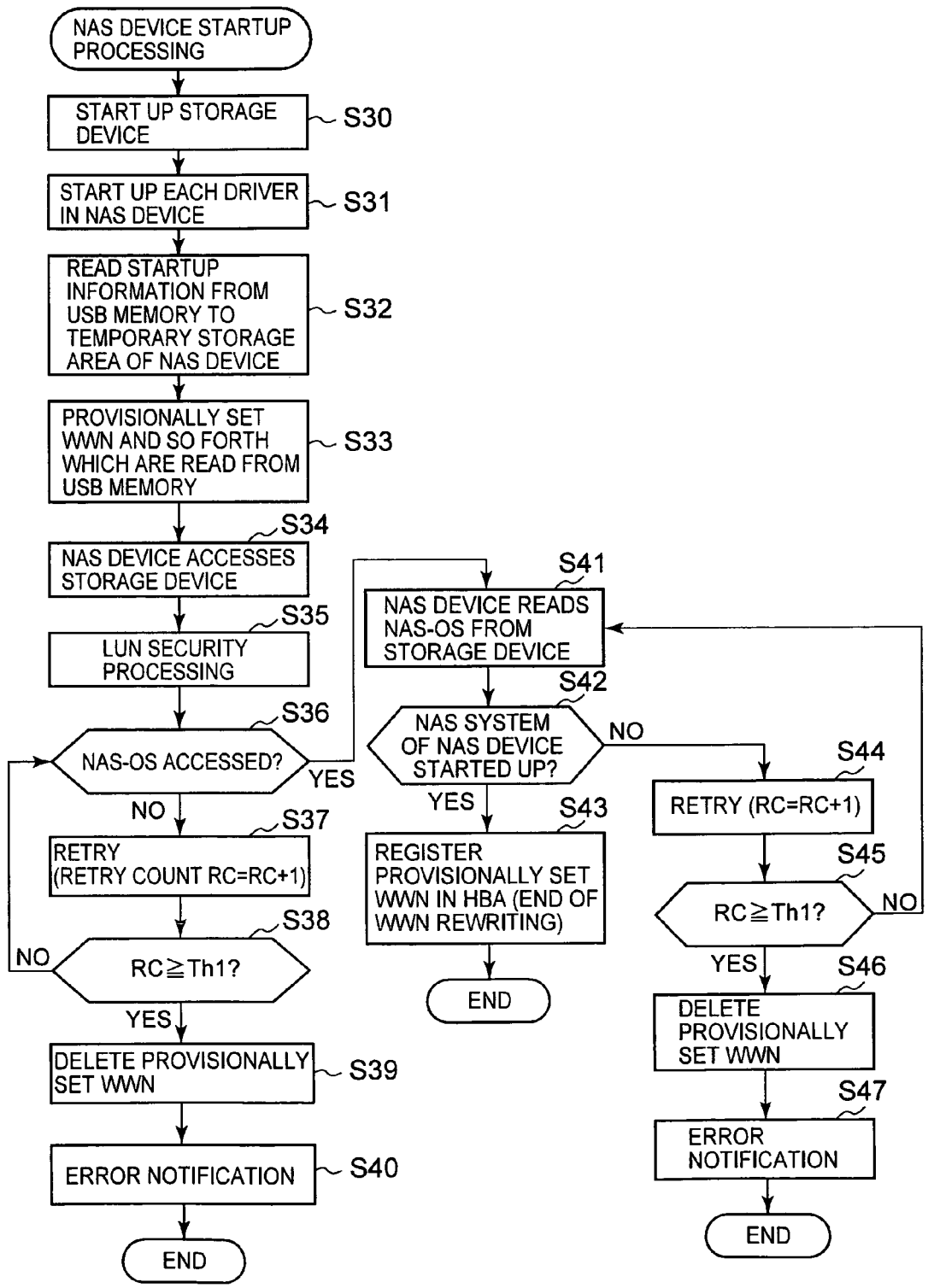
FIG. 6 is a flowchart showing processing to start up the NAS device by using startup information that is stored in the USB memory.

FIG. 6 is a flowchart showing the processing to connect a NAS device 10 that had undergone maintenance work to the file sharing system and start up the NAS device 10. The respective flowcharts shown in FIG. 6 provide an overview of the respective processing within the range required to understand and implement the present invention and sometimes differ from those of an actual computer program. A person skilled in the art is surely able to switch the numbering of the illustrated steps, delete some steps, and add new steps.

First, the storage device 100 is started up after physically connecting the NAS device 10 and storage device 100 (S30). Thereafter, power is supplied to the NAS device 10 and the respective drivers 200 to 202 are started up (S31).

The NAS device 10 (USB driver 200) reads the startup information 50 from the USB memory 20 and stores same in the temporary storage area (S32). The NAS device 10 provisionally sets the startup information 50 read from the USB memory 20 for the HBA 13 (S33). The NAS device 10 (FC driver 201) attempts access to the storage device 100 based on the provisionally set WWN and so forth (S34). Here, a read command is issued by the NAS device 10, for example.

When an access request is issued by the NAS device 10, the storage device 100 uses the management table T1 to execute LUN security processing (S35). The NAS device 10 judges whether to access the NAS-OS (S36). In other words, the NAS device 10 judges whether a logical volume 122 storing the NAS-OS has been mounted in the NAS device 10.

In cases where access to the NAS-OS has not been possible (S36: NO), the NAS device 10 re-attempts access to the NAS-OS and adds one to the retry count RC (S37). In cases where the NAS device 10 has been unable to access the NAS-OS even though the retry count RC has reached a predetermined count Th1 that is preset (S38: YES), the NAS device 10 deletes the startup information 50 stored in the temporary storage area (S39). The NAS device 10 notifies the user of the error via the user interface 14 (S40).

A case where it has not been possible to access the NAS-OS with the provisionally set startup information 50 may be considered to be a case where the USB memory 20 is mounted in NAS device 10 other than the NAS device 10 that has undergone maintenance work. In other words, this is because a NAS device 10 other than the re-startup target NAS device 10 is currently operating normally and it is not possible to start up the NAS-OS by mounting a different logical volume 122. At that point, in S40, an error message such as 'Please check where the USB memory is mounted', for example, is displayed.

In contrast, in cases where it has been possible to access the NAS-OS with the provisionally set startup information 50 (S36: YES), the NAS device 10 (SAN boot driver 202) reads the NAS-OS from the mounted logical volume 122 (S41). The NAS device 10 judges whether the NAS-OS has started up normally (S42). In cases where the NAS-OS has started up normally (S42: YES), the NAS device 10 stores the startup information 50 that has been read from the USB memory 20 in the HBA 13 (S43). In other words, the NAS device 10 overwrites the startup information 50 read from the USB memory 20 with information that is stored in the HBA 13. The overwriting of startup information is thus complete.

Removal of the USB memory 20 from the NAS device 10 by way of an erroneous operation by the user in the course of the startup of the NAS-OS may also be considered. Here, in cases where the NAS-OS does not start up normally (S42: NO), the NAS device 10 re-attempts the reading and startup of the NAS-OS only a predetermined number of times Th1 (S44, S45). In cases where the retry count RC reaches Th1 (S45: YES), the NAS device 10 deletes the provisionally set startup information 50 (S46) and notifies the user of the error (S47).

In S47, an error message such as 'The start-up of the NAS-OS has failed. Please check the host of the USB memory' for example, can be displayed, for example.

This embodiment with this constitution affords the following effects. In this embodiment, the startup information 50 required to start up the NAS device 10 is saved to the USB memory 20 prior to the maintenance work for the NAS device 10. Further, in this embodiment, by mounting the USB memory 20 in a NAS device 10 that has undergone maintenance work, the information of the WWN or the like can be set automatically for the NAS device 10, the NAS-OS can be read from the logical volume 122, and the NAS-OS can thus be started up. Therefore, there is no need for the user to manually perform various settings and the maintenance work for the NAS device 10 and the re-startup thereof can be carried out easily, whereby user convenience improves.

According to this embodiment, in cases where the startup of the NAS-OS is attempted using the startup information 50 that is stored in the temporary storage area and the NAS-OS starts up normally, the startup information 50 in the HBA 13 is overwritten with the startup information 50 in the USB memory 20. The NAS device 10 can therefore be started up more stably.

According to this embodiment, even in cases where the USB memory 20 is mounted in another NAS device 10, the NAS device 10 is unable to read and start up the NAS-OS. Hence, user convenience and the stability of the file sharing system improve.

Second Embodiment

The second embodiment of the present invention will now be described based on FIGS. 7 and 8. The respective embodiments described hereinbelow correspond to modified examples of the first embodiment. In this embodiment, prior to attempting access to the NAS-OS by using the startup information 50 in the USB memory 20, it is diagnosed whether the USB memory 20 is connected to a NAS device 10 other than the NAS device 10 which is to be connected originally.

Figure 7:
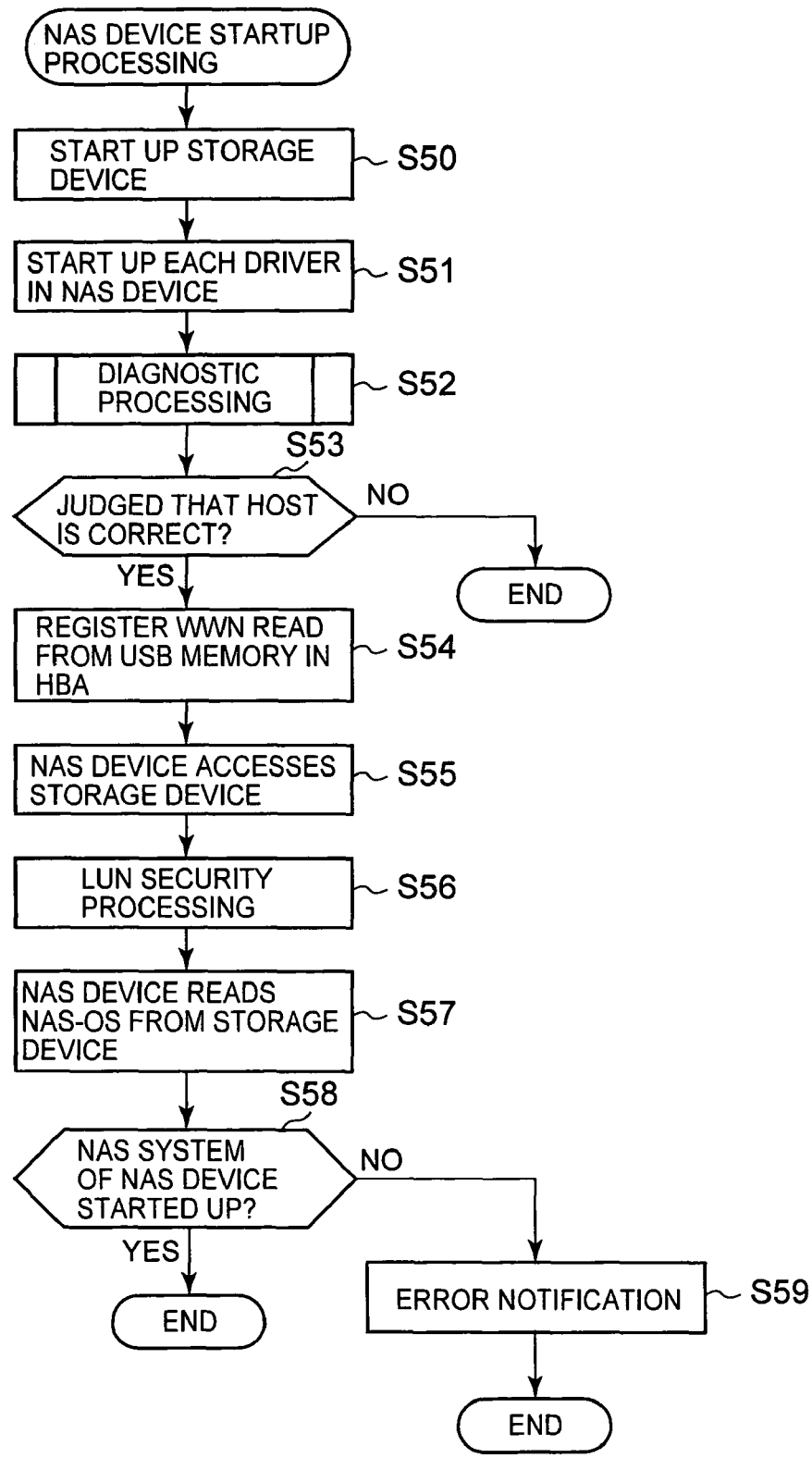
FIG. 7 is a flowchart showing processing to startup the NAS device which is executed by the file sharing system according to a second embodiment.

FIG. 7 is a flowchart showing, in simplified form, processing to startup the NAS device 10 according to this embodiment. The storage device 100 is started up after physically connecting the NAS device 10 that has undergone maintenance work and the storage device 100 (S50). Thereafter, the respective drivers 200 to 202 of the NAS device 10 are started up (S51) and then the diagnostic processing is executed (S52). The details of the diagnostic processing will be described subsequently in conjunction with FIG. 8.

As a result of the diagnostic processing of S52, in cases where it is judged that the host of the USB memory 20 is correct (S53: YES), the NAS device 10 stores the startup information 50 read from the USB memory 20 in the HBA 13 (S54) and accesses the logical volume 122 in the storage device 100 (S55). If an access request is issued by the NAS device 10, the storage device 100 executes LUN security processing (S56). The NAS device 10 reads the NAS-OS (S57) and judges whether the NAS-OS has started up normally (S58).

In cases where the NAS-OS has started up normally (S58: YES), this processing ends. In cases where the NAS-OS has not started up normally (S58: NO), the NAS device 10 notifies the user of the error (S59). When it is judged that the host is incorrect (S53: NO), this processing ends. Thereupon, the user can be notified of the error.

In cases where, as a result of the diagnosis, it is judged that the host of the USB memory 20 is correct (S53: YES), the information in the HBA 13 is not directly overwritten by the startup information 50 in the USB memory 20 (S54) and, as per the first embodiment, the constitution may also be such that the information in the HBA 13 is overwritten after it has been confirmed that the NAS-OS has started up normally (S58: YES). In addition, the retries of a predetermined count mentioned in the first embodiment can also be executed by this embodiment.

Figure 8:
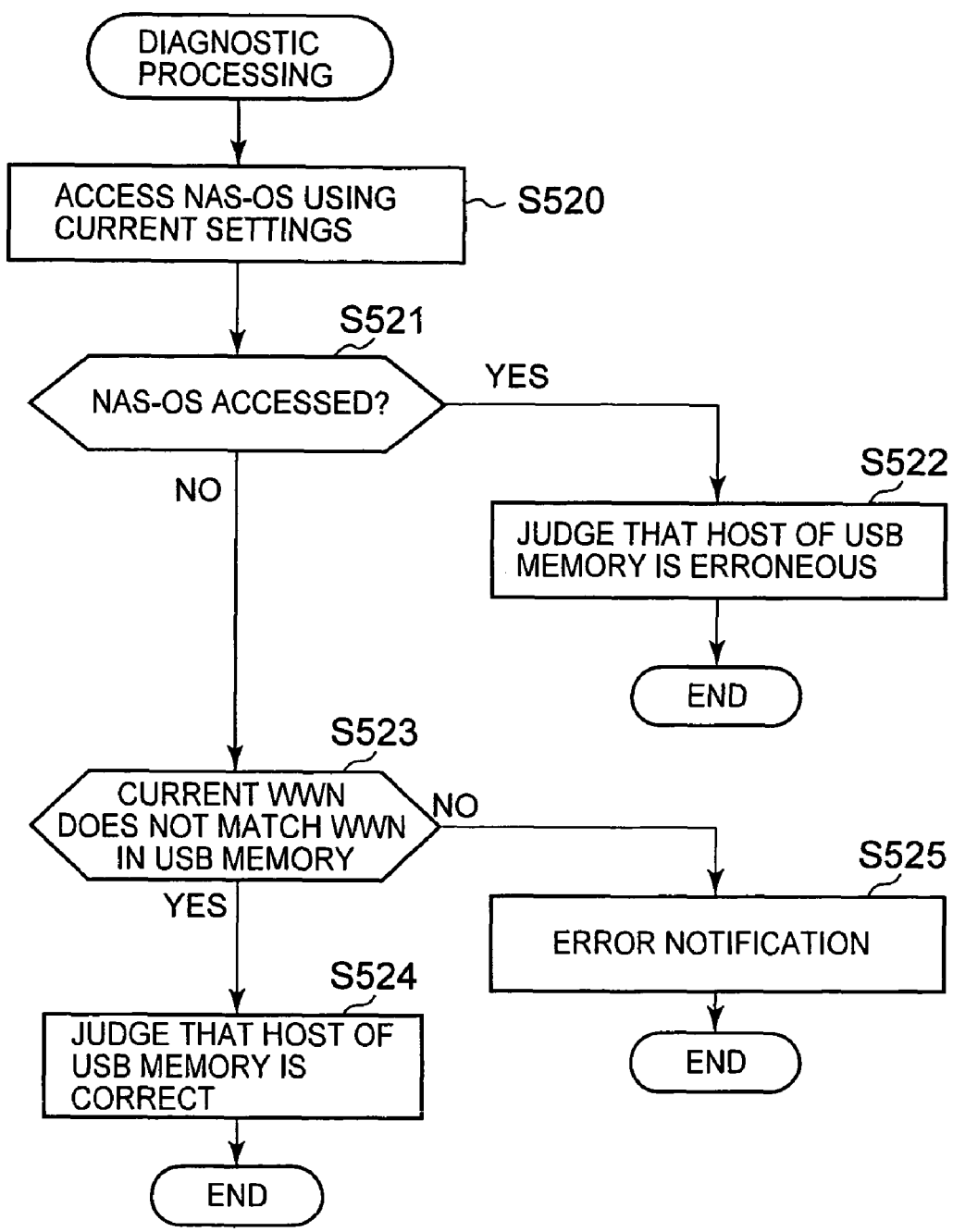
FIG. 8 is a flowchart showing the content of the diagnostic processing in FIG. 7.

FIG. 8 is a flowchart showing the details of the diagnostic processing shown in S52 in FIG. 7. First, the NAS device 10 re-attempts access to the NAS-OS with the startup information 50 that is currently set for the HBA 13 (S520) and judges whether access has been made (S521).

In cases where the NAS-OS has been accessed with the current settings (S521: YES), it can be considered that the USB memory 20 is connected to a NAS device 10 other than the predetermined NAS device 10. This is because the NAS-OS can be accessed without the need to use the startup information 50 in the USB memory 20. Therefore, the NAS device 10 judges that the host of the USB memory 20 is erroneous (S522).

In cases where it has not been possible to access the NAS-OS by using the startup information 50 that is currently set for the HBA 13 (S521: NO), the NAS device 10 judges whether the WWN stored in the USB memory 20 and the WWN stored in the HBA 13 do not match (S523).

In cases where the WWN stored in the USB memory 20 and the WWN currently set for the HBA 13 do not match (S523: YES), the NAS device 10 judges that the host of the USB memory 20 is correct (S524). In contrast, in cases where the WWN currently set for the HBA 13 and the WWN stored in the USB memory 20 match (S524: YES), the NAS device 10 notifies the user of the error (S525). This embodiment with this constitution affords the same effects as those of the first embodiment.

Third Embodiment

The third embodiment will now be described on the basis of FIGS. 9 and 10. In this embodiment, the feasibility of access to the NAS-OS is judged by using a serial number for uniquely identifying the HBA 13 rather than just LUN security processing that is executed by the storage device 100.

The significance of this embodiment will first be described. For the sake of comprehension, let the NAS device that has undergone maintenance work be NAS device 10 (1) and the other NAS device be NAS device 10 (2). Further, let the startup information of the NAS device 10 (1) be startup information 50 (1) and the USB memory that stores the startup information 50 (1) be USB memory 20 (1). Likewise, let the startup information of the NAS device 10 (2) be startup information 50 (2) and the USB memory that stores the startup information 50 (2) be USB memory 20 (2).

As mentioned in the first embodiment, in cases where the NAS device 10 (1) is started up again, the USB memory 20 (1) may be mounted on the NAS device 10 (1). If the user mounts the USB memory 20 (1) on the NAS device 10 (2) by mistake, a logical volume 122 is already mounted on the NAS device 10 (2) and, therefore, the NAS-OS used for the NAS device 10 (1) cannot be read and started up.

However, if the user mounts the USB memory 20 (2) on the NAS device 10 (1) by mistake, there is a risk that startup information 50 (2) will be set for the NAS device 10 (1). In this case, there can be no distinction between the NAS device 10 (1) and NAS device 10 (2) from the perspective of the storage device 100. This is because both the NAS devices 10 (1) and 10 (2) have the same startup information 50 (2).

Therefore, according to this embodiment, the NAS device 10 (1) and NAS device 10 (2) are distinguished using characteristic identification information that is set for the HBA 13 and access by a device other than the NAS device 10 (2) that was originally capable of access is denied.

Figure 9:
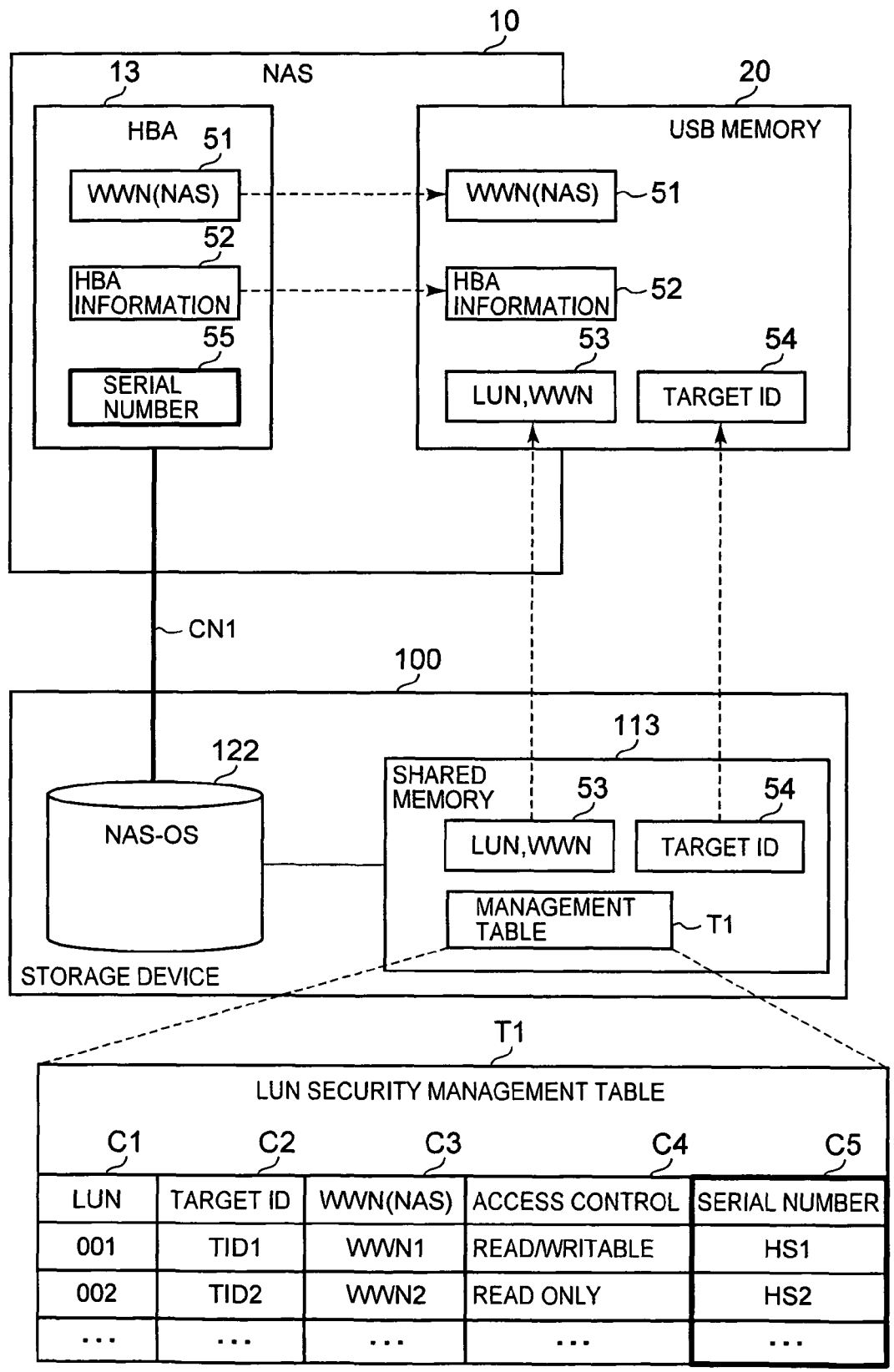
FIG. 9 is an explanatory diagram of the constitution of the LUN security management table used by the file sharing system according to a third embodiment.

FIG. 9 is an explanatory diagram showing an example of the management table T1 of this embodiment. The management table T1 has a serial number item C5 added thereto. A serial number is identification information for uniquely specifying the HBA 13 within the file sharing system. There is no need for consecutive numbers as long as the information is information that allows the HBA 13 to be uniquely specified.

The storage device 100 acquires the serial number of the HBA 13 from the NAS device 10 prior to the exchange of the NAS device 10 and pre-stores the serial number in the management table T1. Further, once the NAS device 10 is exchanged, the serial number of the HBA 13 can be transmitted from the NAS device 10 to the storage device 100 and the accessibility based on the serial number can be judged by the storage device 100.

Figure 10:
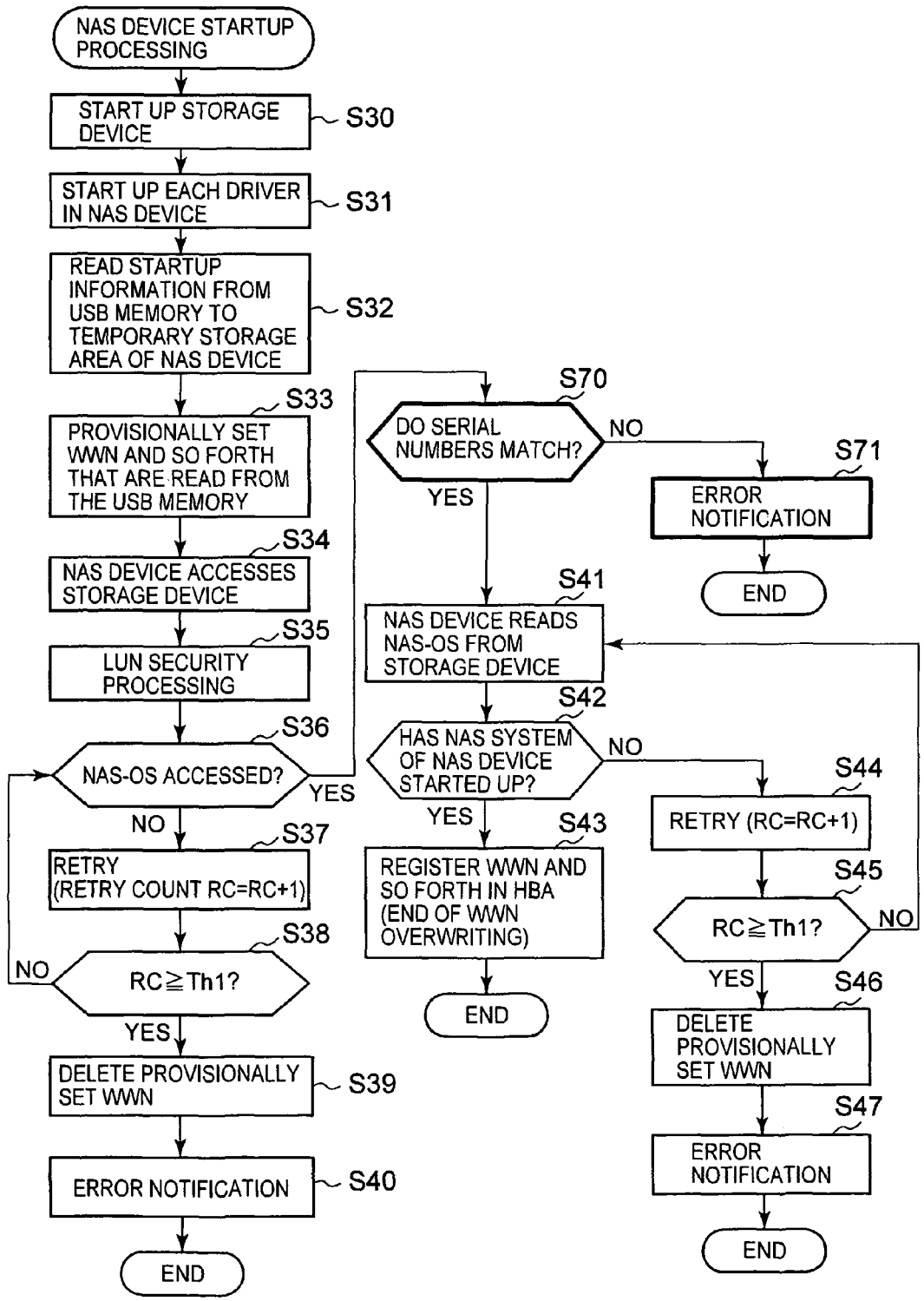
FIG. 10 is a flowchart showing processing to start up the NAS device.

FIG. 10 is a flowchart showing processing to start up the NAS device 10 according to this embodiment. The flowchart comprises the steps S30 to S47 that are common to the flowchart shown in FIG. 6. In this embodiment, S70 and S71 have been newly added. Therefore, a description of the common steps is omitted and the focus of the description is on the steps which are characteristic of this embodiment.

In cases where the NAS-OS has been accessed with the startup information 50 stored in the temporary storage area (S36: YES), the storage device 100 acquires the serial number of the HBA 13 from the NAS device 10 that has achieved access and judges whether the serial number of the HBA 13 thus acquired and the serial number that is stored in management table T1 match one another (S70).

In cases where there is indeed a match between the serial number registered in the management table T1 beforehand and the serial number acquired from the NAS device 10 that achieved access in S36 (S70: YES), this means that the USB memory 20 is connected to the correct NAS device 10. Therefore, S41 and the subsequent steps are executed.

When where there is no match between the two serial numbers (S70: NO), this means that the USB memory 20 is connected to a NAS device 10 that is different from the NAS device 10 that was originally arranged. Therefore, the NAS device 10 notifies the user of the error (S71).

This embodiment with this constitution affords the same effects as those of the first embodiment. In addition, according to this embodiment, in cases where the WWN or the like match and access to the NAS-OS is successful, the storage device 100 also judges the feasibility of access based on the serial number. In other words, in this embodiment, a first accessibility judgment by way of LUN security processing and a second accessibility judgment based on the serial number are each executed. Hence, according to this embodiment, even in cases where another USB memory 20 has been mounted on the NAS device 10 to be exchanged for maintenance by mistake, the NAS device 10 to be exchanged for maintenance is naturally able to prevent access to another logical volume for which access is not permitted. As a result, user convenience and reliability of the maintenance exchange work improve further.

Fourth Embodiment

Figure 11:
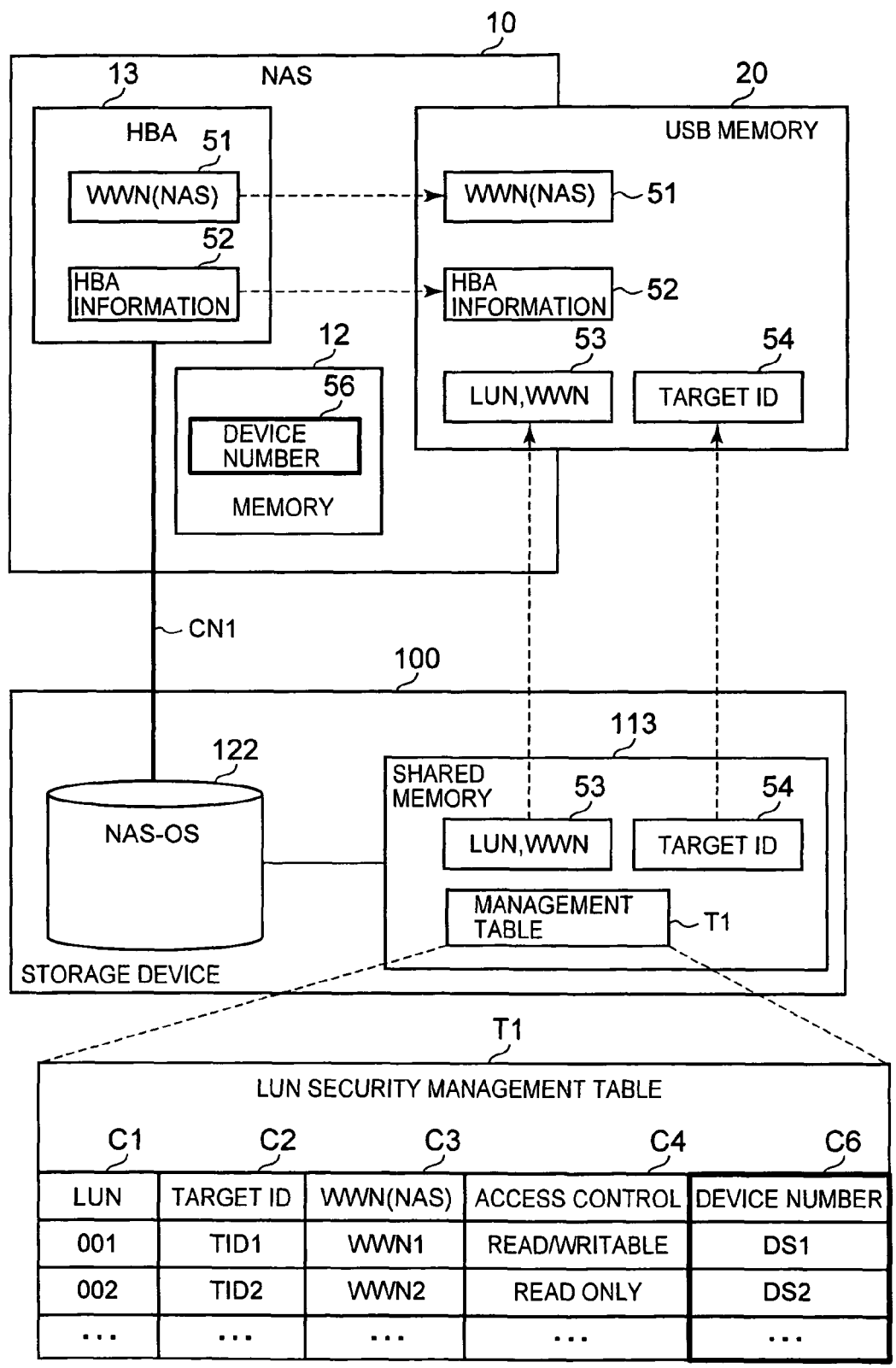
FIG. 11 is an explanatory diagram of the constitution of the LUN security management table that is used by the file sharing system according to a fourth embodiment.

A fourth embodiment will now be described based on FIGS. 11 and 12. In this embodiment, the device numbers of the NAS device 10 are used in place of the serial numbers of the HBA 13 used in the third embodiment. FIG. 11 is an explanatory diagram of an example of the management table T1 according to this embodiment. The management table T1 has a sixth item C6 for managing the device numbers of the NAS devices 10 added thereto. The device number is identification information for uniquely specifying the NAS devices 10 within the file sharing system.

Figure 12:
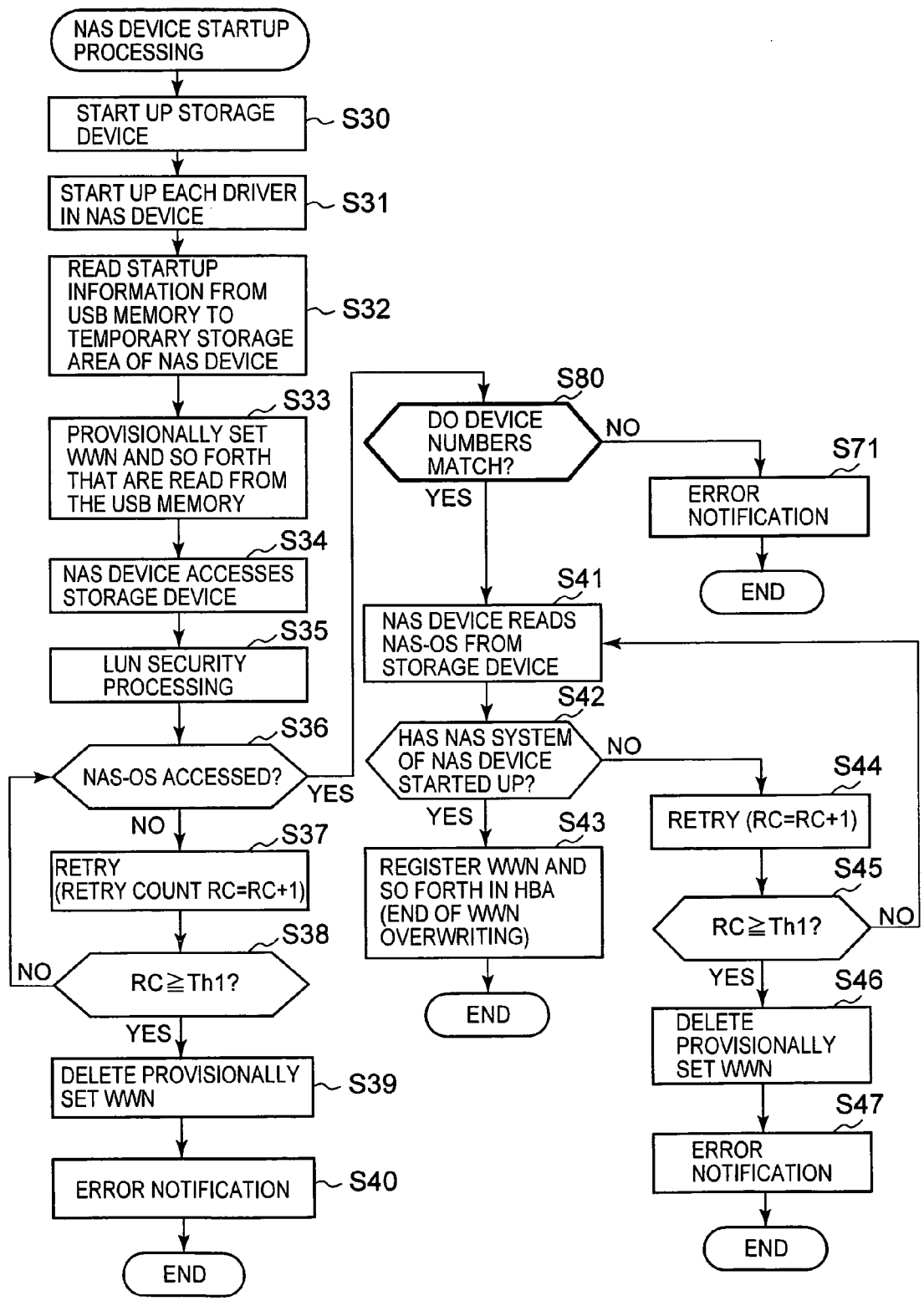
FIG. 12 is a flowchart showing processing to start up the NAS device.

FIG. 12 is a flowchart showing the startup processing of the NAS device 10. Instead of the S70 that was described in the third embodiment, it is judged in S80 of this embodiment whether the device number acquired from the NAS device 10 that achieved access and the serial number that is registered in the management table T1 match one another (S80). This embodiment with this constitution also affords the same effects as those of the first and third embodiments.

Fifth Embodiment

A fifth embodiment will now be described based on FIGS. 13 and 14. In this embodiment, the serial number of the HBA 13 is uniquely stored when the startup information 50 is stored in the USB memory 20. Further, in cases where the USB memory 20 is attached to the NAS device 10, the serial number in the USB memory 20 and the serial number of the HBA 13 in the NAS device 10 are compared and it is confirmed whether the USB memory 20 is connected to the correct host. In other words, in this embodiment, the serial number of the HBA 13 is used as information for representing the relationship between the USB memory 20 and NAS device 10.

Figure 13:
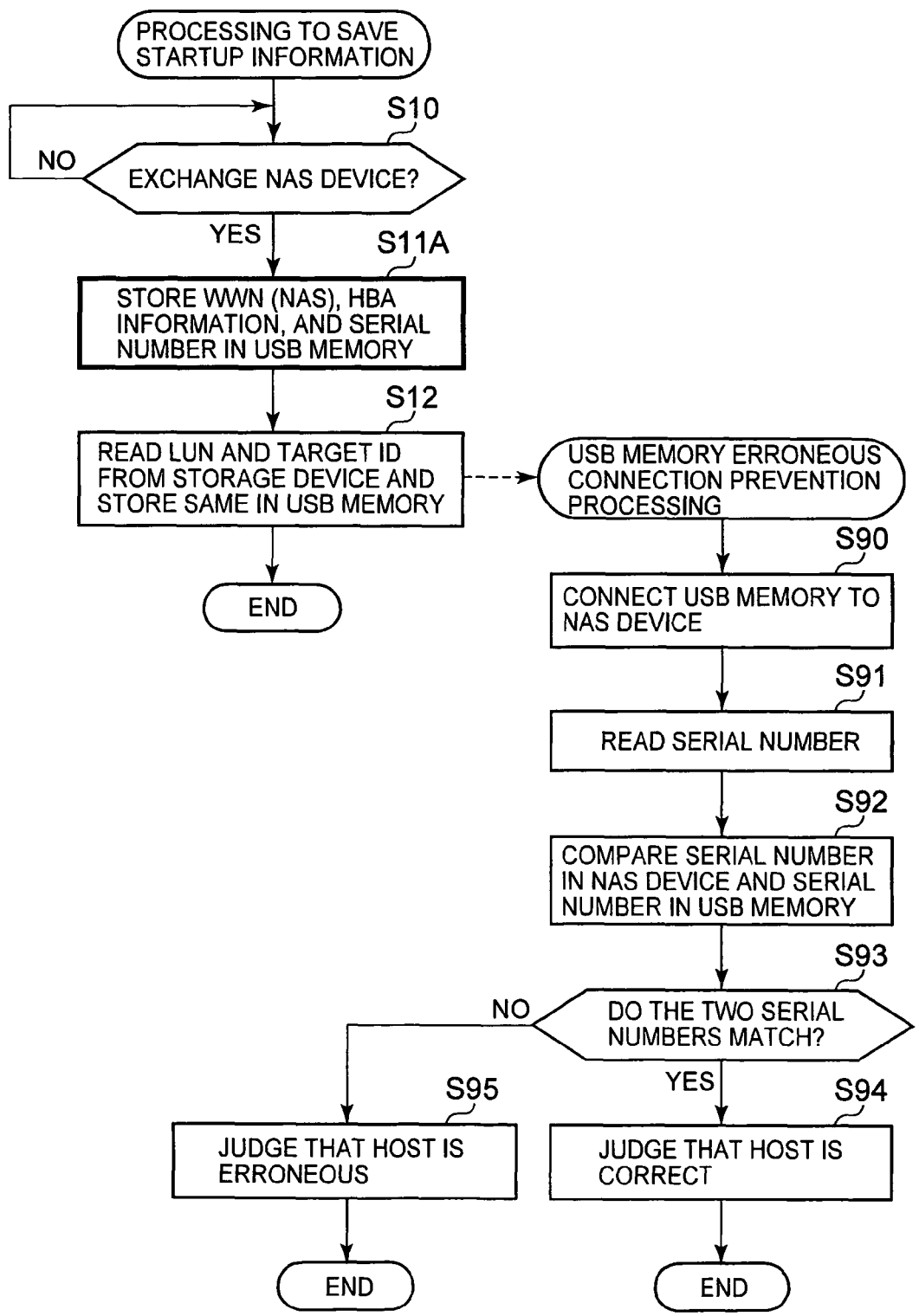
FIG. 13 is a flowchart showing the respective processing to save startup information to the USB memory and to prevent an erroneous connection of the USB memory which are executed by the file sharing system according to a fifth embodiment.

FIG. 13 is a flowchart showing the error connection prevention processing of the USB memory 20 and the processing to save the startup information. The processing will be described starting with the saving processing. When an exchange contract for the NAS device 10 is in place (S10: YES), the NAS device 10 stores the serial number of the HBA 13 in the USB memory 20 in addition to the startup information 50 such as the WWN and target (S11A, S12).

The erroneous connection prevention processing for the USB memory 20 will now be described. If the USB memory 20 is attached to the NAS device 10 (S90), the NAS device 10 reads the serial number of the HBA 13 that is stored in the USB memory 20 (S91) and compares the serial number thus read with the serial number of the HBA 13 in the NAS device 10 (S92).

In cases where the two serial numbers match one another (S93: YES), the NAS device 10 judges that the host of the USB memory 20 is correct (S94). In contrast, in cases where the two serial numbers do not match one another (S93: NO), the NAS device 10 judges that the host of the USB memory 20 is erroneous (S95). In the case of an erroneous connection, the NAS device 10 is able to notify the user of the error. This embodiment with this constitution affords the same effects as those of the first embodiment.

Sixth Embodiment

The sixth embodiment will be described based on FIG. 14. According to this embodiment, the 'serial number and device number' are used in place of the serial number mentioned in the fifth embodiment. That is, in this embodiment, a combination of a serial number and device number is used as information representing the relationship between the USB memory 20 and NAS device 10.

Figure 14:
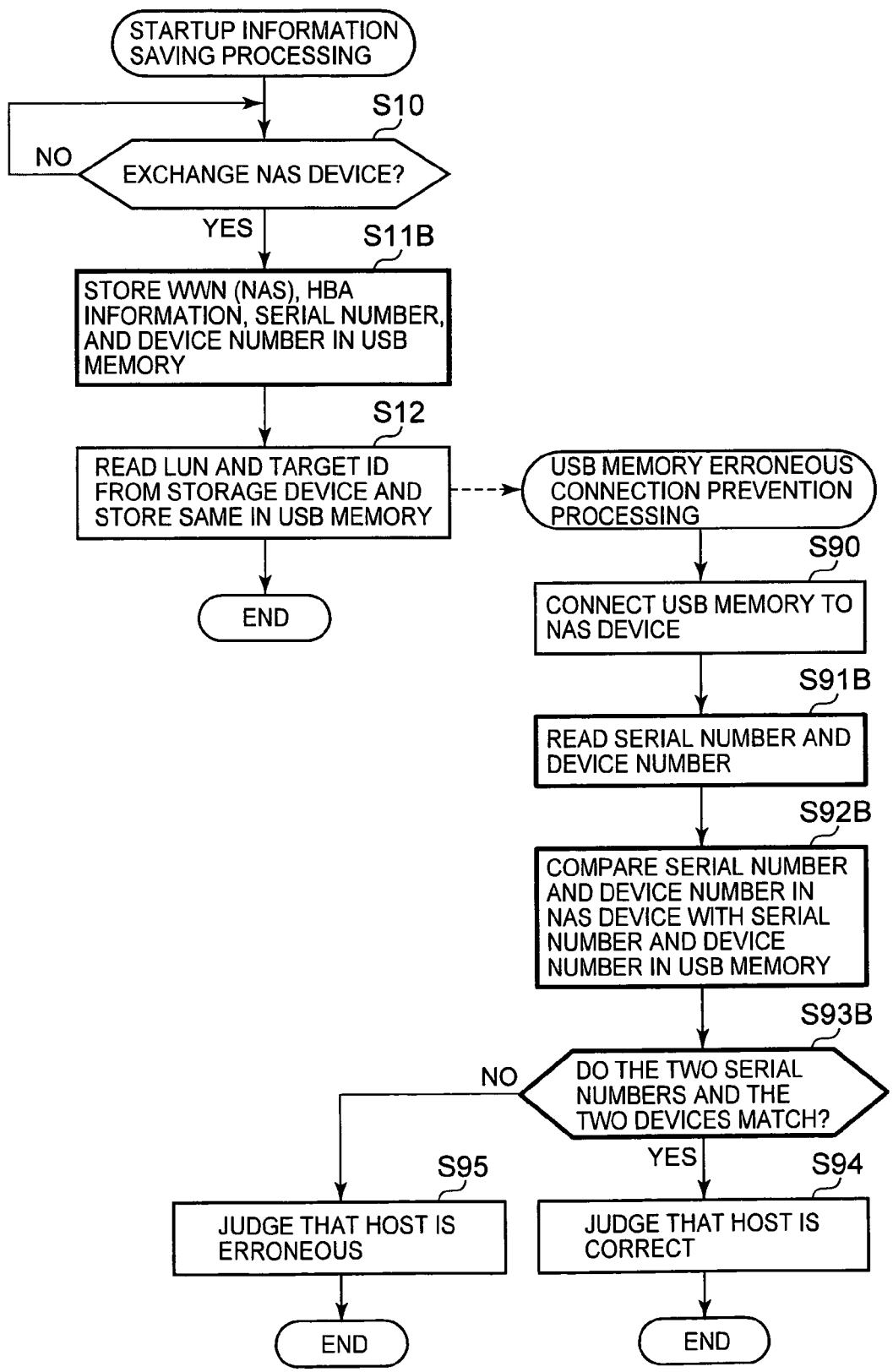
FIG. 14 is a flowchart showing the respective processing to save startup information to the USB memory and to prevent an erroneous connection of the USB memory which are executed by the file sharing system according to a sixth embodiment.

FIG. 14 is a flowchart showing the saving processing and the erroneous connection prevention processing of the USB memory 20 according to this embodiment. The NAS device 10 stores the serial number and device number in the USB memory 20 when the startup information 50 is stored in the USB memory 20 (S11B).

When the USB memory 20 is attached to the NAS device 10 (S90), the NAS device 10 reads the serial number and device number stored in the USB memory 20 (S91B) and compares the serial number thus read with the serial number and device number in the NAS device 10 (S92B).

In cases where the two serial numbers match one another and the two device numbers match one another (S93B: YES), the NAS device 10 judges that the host of the USB memory 20 is correct (S94). In contrast, in a case where the two serial numbers do not match one another or where the two device numbers do not match one another (S93B: NO), the NAS device 10 judges that the host of the USB memory 20 is erroneous (S95). In the case of an erroneous connection, the NAS device 10 is able to notify the user of the error. Thus, this embodiment with this constitution affords the same effects as those of the first embodiment.

Seventh Embodiment

A seventh embodiment will now be described based on FIGS. 15 and 16. According to this embodiment, it is judged whether the relationship between the NAS device 10 and USB memory 20 is correct by using an ID tag 21 that is provided in the USB memory 20.

Figure 15:
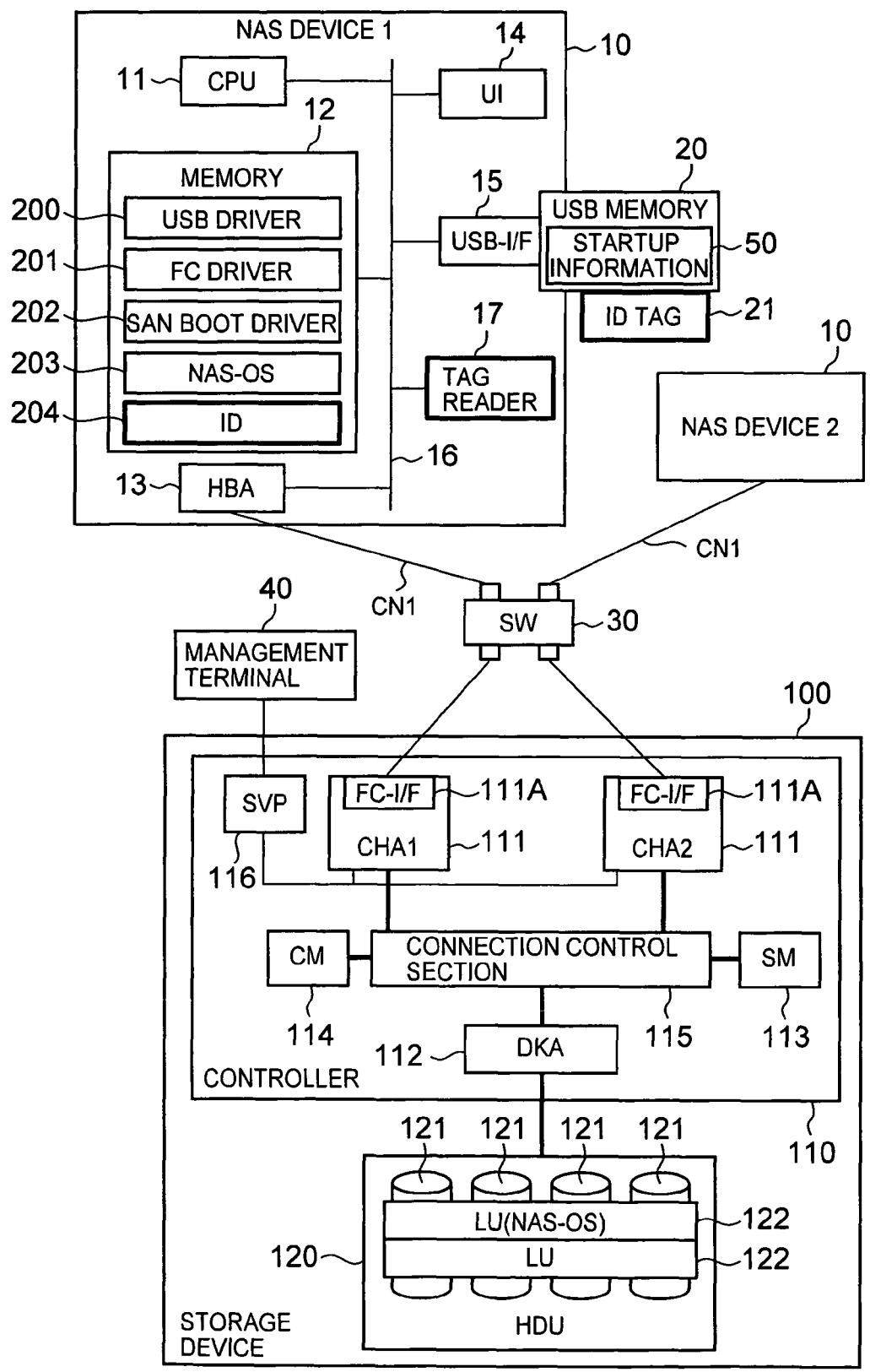
FIG. 15 is an explanatory diagram of the hardware constitution of the file sharing system according to a seventh embodiment.

FIG. 15 is an explanatory diagram of the constitution of the file sharing system according to this embodiment. The ID tag 21 is provided in the USB memory 20 of this embodiment. The NAS device 10 is provided with a tag reader 17. In addition, an ID 204 which is the same as the ID stored in the ID tag 21 is pre-stored in the memory 12 of the NAS device 10.

The tag reader 17 transmits a wireless signal at regular intervals or when the USB memory 20 and interface 15 are connected. The ID tag is constituted comprising, for example, a memory where IDs are stored, a receiver circuit, a control circuit that operates by taking the induced electromotive force obtained by the receiver circuit as its power source, and a transmitter circuit. Upon receipt of radio waves emitted by the tag reader 17, the ID tag 21 generates a response signal comprising an ID and transmits the response signal.

Figure 16:
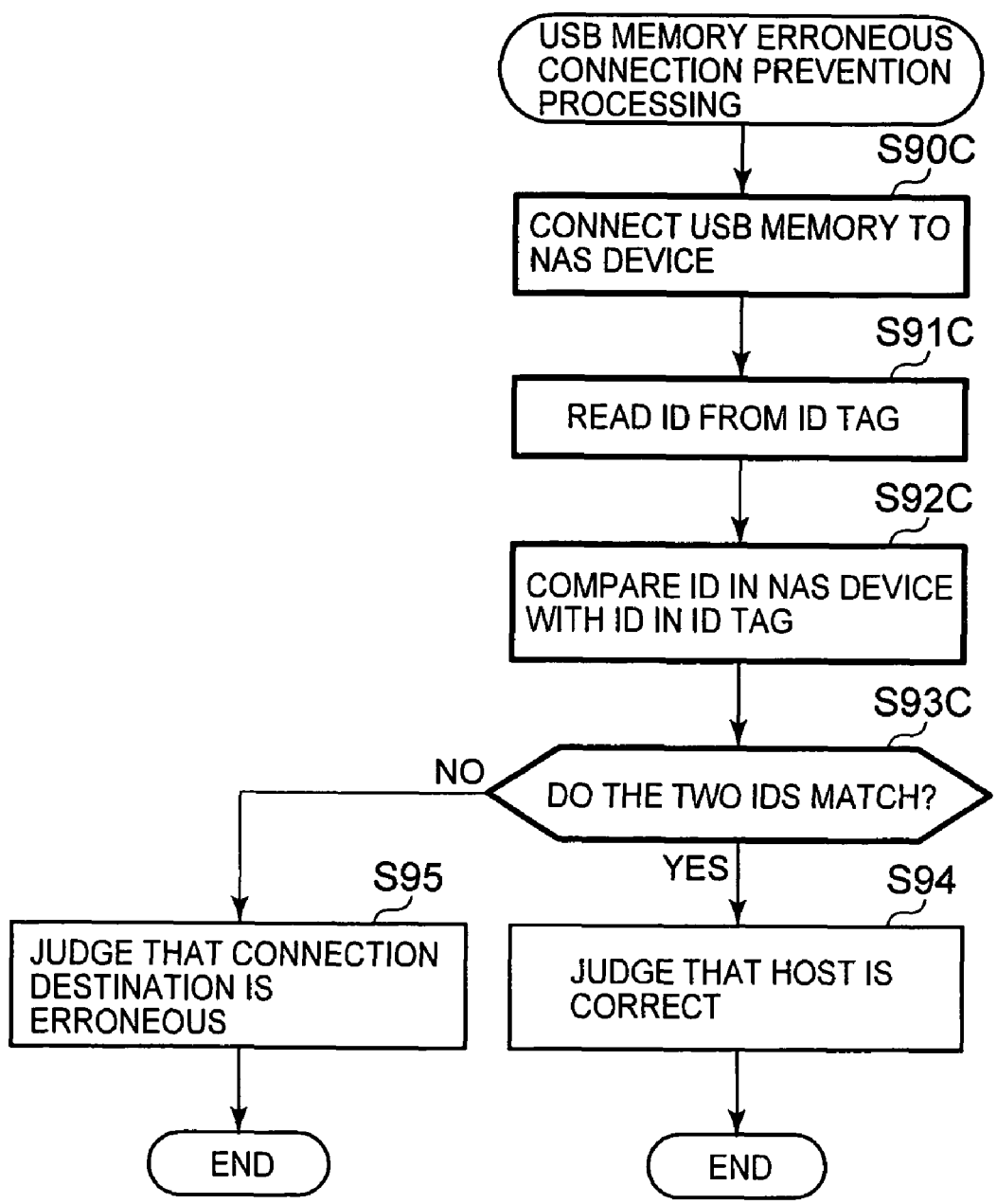
FIG. 16 is a flowchart showing processing to prevent an erroneous connection of the USB memory.

FIG. 16 is a flowchart showing the erroneous connection prevention processing of the USB memory 20. If the USB memory 20 is connected to the interface 15 (S90C), the NAS device 10 reads the ID that was stored in the ID tag 21 by the tag reader 17 (S91C). The NAS device 10 compares the ID 204 stored in the memory 12 with the ID read from the ID tag 21 (S92C) and judges whether the two IDs match one another (S93C).

In cases where the two IDs match (S93C: YES), the NAS device 10 judges that the host of the USB memory 20 is correct (S94). In cases where the two IDs do not match one another (S93C: NO), the NAS device 10 judges that the host of the USB memory 20 is erroneous (S95). This embodiment with this constitution also affords the same effects as those of the first embodiment.

The present invention is not limited to that above embodiments. A person skilled in the art is able to make a variety of additions or modifications or the like within the scope of the present invention.

What is claimed is:

1. A file sharing system having a plurality of file sharing devices and a storage control device that is connected to the file sharing device, wherein
   (1) the storage control device comprises:
   (1-1) a plurality of logical volumes; in which an operating system that is read to the plurality of file sharing devices is pre-stored, and data that is used by the plurality of file sharing devices is stored;
   (1-2) an access control section determining whether each of file sharing devices is permitted to access to the logical volumes or not, based on a LUN security management table, managing a correspondence between the plurality of file sharing devices and the plurality of logical volumes, and permitted type of access; and
   (1-3) an I/O control section which, in cases where access from a first file sharing device of the plurality of file sharing devices to a first logical volume of the plurality of logical volumes is permitted by the access control section, writes and reads data stored in the first logical volume in response to a request from the first file sharing device, and (2) the first file sharing device comprises:
- (2-1) an interface section for a connection to an external storage medium;
- (2-2) a communication control section that communicates with the storage control device via a communication path for which authentication is required at the time of access;
- (2-3) a collection section that collects predetermined information that is required in order to access the first logical volume;
- (2-4) a saving section that stores the collected predetermined information in the external storage medium via the interface section, the predetermined information includes identification information for uniquely specifying the first file sharing device among the plurality of the file sharing devices;
- (2-5) a startup control section for starting up the operating system; and
- (2-6) a setting section that stores the predetermined information in a temporary storage area from the external storage medium via the interface section in accordance with an instruction from the startup control section and sets the predetermined information for the communication control section temporarily; wherein if the communication control section can access the operating system based on the LUN security management table, the communication control section reads the operating system from the first logical volume by using the predetermined information stored in the temporary storage area, wherein the access control section permits the communication control section to access the first logical volume only when the predetermined information used by the communication control section matches predetermined information that is set for the access control section beforehand based on the LUN security management table, wherein the setting section overwrites the predetermined information to the communication control section as formal information and a file sharing section of the first file sharing device provides file sharing service, after the first file sharing device startups normally with the operating system read from the first logical volume.

2. The fire sharing system according to claim 1, wherein the setting section deletes the predetermined information that is set for the communication control section, if the communication control section is unable to read the operating system from the first logical volume.

3. The file sharing system according to claim 1, wherein the setting section deletes the predetermined information that is set up for the communication control section, if the first file sharing device cannot startup normally with the operating system read from the first logical volume.

4. The file sharing system according to claim 1, wherein the identification information is either one or both of a serial number that is preset for the communication control section and a device number that is preset for the file sharing device.

5. The file sharing system according to claim 1, wherein the first file sharing device comprises an erroneous connection detection section for detecting the erroneous connection of an external storage medium storing predetermined information relating to another file sharing device.

6. The file sharing system according to claim 5, wherein first medium identification information for uniquely identifying the external storage medium is preset for the external storage medium; and the erroneous connection detection section judges that an erroneous connection has been made in cases where second medium identification information that is preset and the first medium identification information that is read from the external storage medium connected to the interface section do not match one another and judges that a correct connection has been made in cases where the second medium identification information matches the first medium identification information.

* * * * *